United States Patent [19]
Izumi et al.

[11] Patent Number: 6,157,410
[45] Date of Patent: *Dec. 5, 2000

[54] PROCESSING AND DISPLAY OF IMAGES RETRIEVED FROM DIGITAL STILL IMAGE FILES GENERATED FROM DIGITAL MOVING IMAGES

[75] Inventors: Nobuaki Izumi, Chiba; Shinichi Fukushima, Kanagawa; Junichi Tsukamoto, Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/854,165

[22] Filed: May 9, 1997

[30] Foreign Application Priority Data

May 17, 1996 [JP] Japan .................................. 8-1446496

[51] Int. Cl.$^7$ .............................. H04N 7/01; H04N 11/00
[52] U.S. Cl. .......................... 348/445; 348/552; 348/556; 348/913
[58] Field of Search .................................... 348/552, 556, 348/557, 558, 445, 913, 458, 561, 562, 581, 441; H04N 7/01, 11/00

[56] References Cited

U.S. PATENT DOCUMENTS

| | | | |
|---|---|---|---|
| 5,159,438 | 10/1992 | Rabii ........................................ | 348/445 |
| 5,343,238 | 8/1994 | Takata et al. ............................. | 348/556 |
| 5,400,077 | 3/1995 | Cookson et al. . | |
| 5,706,451 | 1/1998 | Lightbody et al. ...................... | 348/552 |

FOREIGN PATENT DOCUMENTS

| | | |
|---|---|---|
| 0 431845 | 6/1991 | European Pat. Off. . |
| 0 547633 | 6/1993 | European Pat. Off. . |
| WO 91 06169 | 5/1991 | WIPO . |

OTHER PUBLICATIONS

Willner, R.: "Transforming the PC Into a TV, Radio, VCR, and Video Editing Studio", Wescon '95 Conference Record, Microelectronics, Communications Technology, Producing Quality Products, Mobile and Portable Power, Emerging Technologies, San Francisco, Nov. 7–9, 1995, Nov. 7, 1995, Institute of Electrical and Electronics Engineers, pp. 743–748, XP000586646.

W, Schwartz et al: "A Frame Grabbing Application Using the 66470 and 68070", Electronic Components and Applications, vol. 10, No. 2, Jan. 1, 1990, pp. 78–84, XP000274263.

*Primary Examiner*—Michael H. Lee
*Attorney, Agent, or Firm*—Frommer Lawrence & Haug, LLP.; William S. Frommer; Dexter T. Chang

[57] ABSTRACT

To display an image based on image file data generated from moving images, the number of pixels is changed in the horizontal or vertical direction of a display screen by a signal processing operation. Various television broadcast standards and display modes are supported. For example, in the NTSC system, a signal processing operation subjects frame data (720 by 480 pixels) to 8:9 pixel count conversion for converting the number of pixels in the horizontal direction from 720 to 640. An image based on the image file data (i.e., still picture) is therefore displayed on the computer screen with the correct aspect ratio.

21 Claims, 18 Drawing Sheets

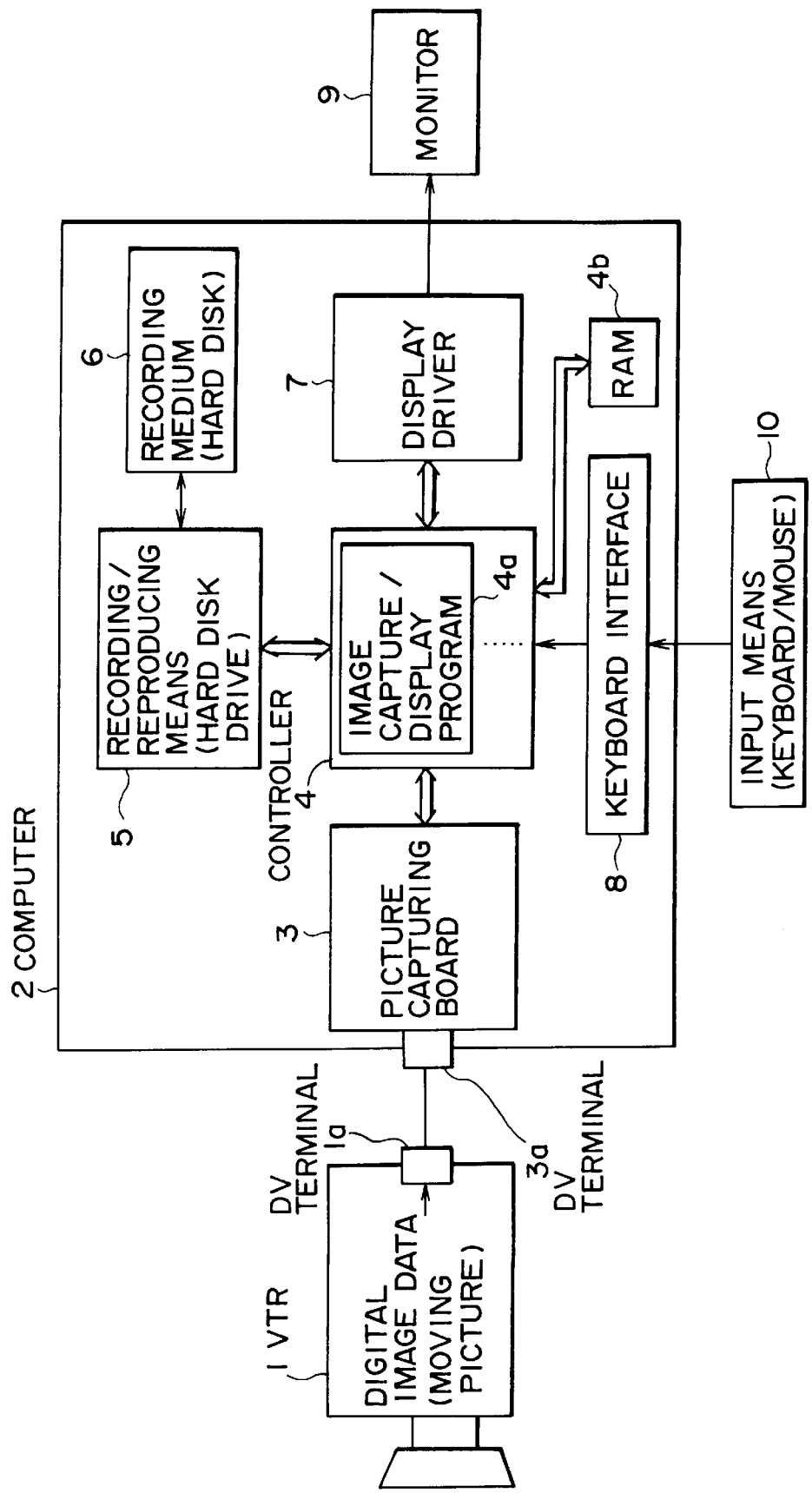

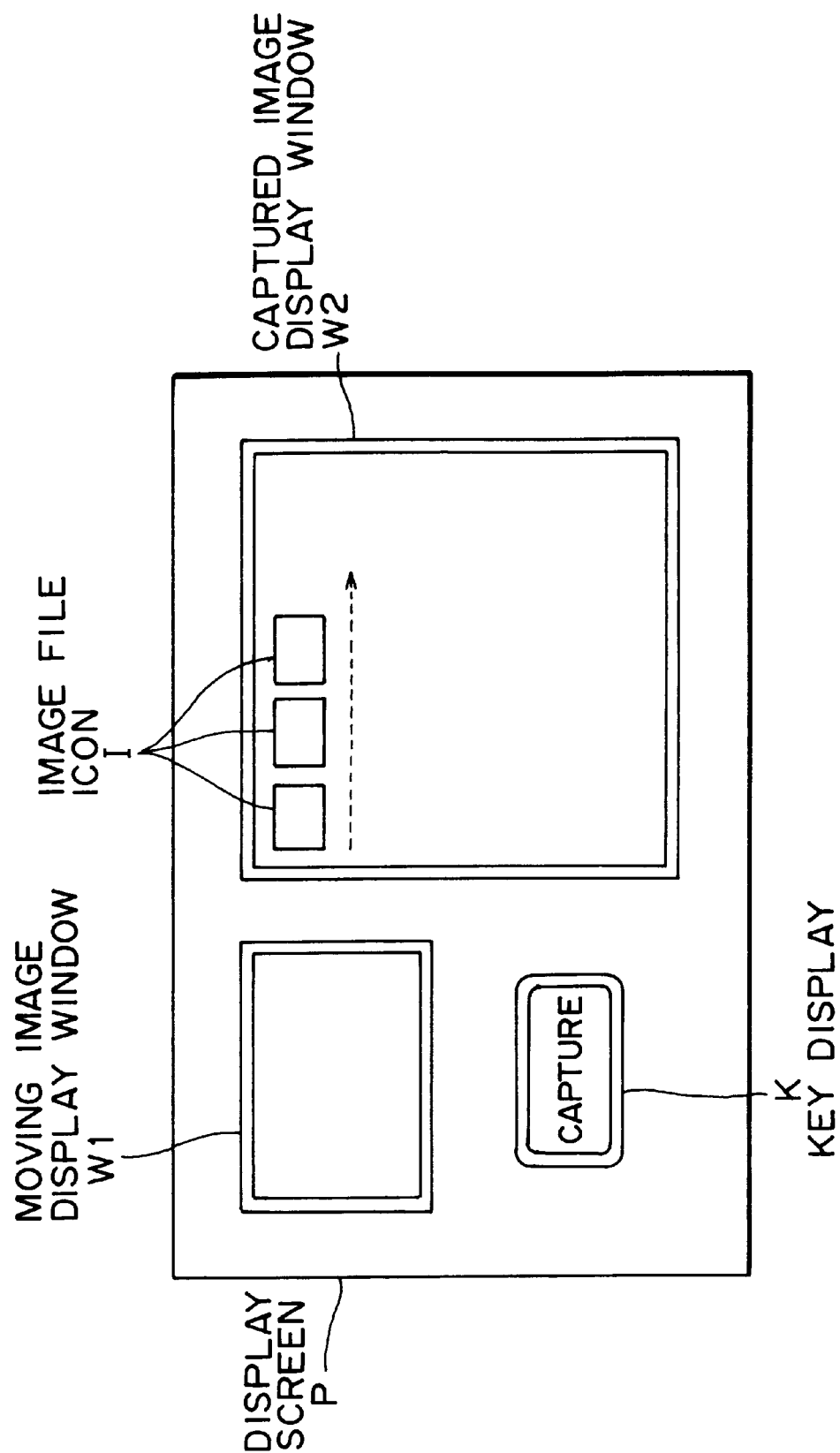

- HEADER (32 BYTES) — A1
- DATA — A2

| OFFSET | CONTENTS | |
|---|---|---|
| 00-03H | FILE IDENTIFIER | A11 |
| 04-07H | FILE VERSION | A12 |
| 08-0AH | FORMAT DETAIL INFORMATION | A13 |
| 0BH | DATA ATTRIBUTE | A14 |
| 0C-0FH | FILE SIZE | A15 |
| 10-13H | DATA SIZE | A16 |
| 14-17H | OFFSET TO DATA | A17 |
| 18-1FH | (RESERVED) | A18 |

TRANSMISSION ORDER OF DIF BLOCKS IN A DIF SEQUENCE

FIG. 9

| | MSB | | | | | | | LSB |
|---|---|---|---|---|---|---|---|---|
| PC0 | 0 | 1 | 1 | 0 | 0 | 0 | 0 | 0 |
| PC1 | TENS OF TV CHANNEL | | | | UNITS OF TV CHANNEL | | | |
| PC2 | B/W | EN | | CLF | | HUNDREDS OF TV CHANNEL | | |
| PC3 | SOURCE CODE | | 50/60 | | STYPE | | | |
| PC4 | TUNER CATEGORY | | | | | | | |

FIG. 10

| STYPE | 50/60 | |
|---|---|---|
| | 0 | 1 |
| 00000 | 525-60 SYSTEM | 625-50 SYSTEM |
| 00001 | SDL 525-60 SYSTEM | SDL 625-50 SYSTEM |
| 00010 | 1125-60 SYSTEM | 1250-50 SYSTEM |
| 00011 ⋮ 11111 | RESERVED | |

FIG. 11

| PC0 | 0 | 1 | 1 | 0 | 0 | 0 | 0 | 0 |
|---|---|---|---|---|---|---|---|---|
| PC1 | CGMS | | ISR | | CMP | | SS | |
| PC2 | REC ST | 1 | REC MODE | | 1 | DISP | | |
| PC3 | FF | FS | FC | IL | ST | SW | BCSYS | |
| PC4 | 1 | GENRE CATEGORY | | | | | | |

MSB (left)     LSB (right)

FIG. 12

| BCSYS | DISP | ASPECT RATIO AND FORMAT | POSITION | |
|---|---|---|---|---|
| 00 | 000 | 4:3 FULL FORMAT | NOT APPLICABLE | ← NORMAL MODE |
|  | 001 | 16:9 LETTER BOX | CENTRE |  |
|  | 010 | 16:9 FULL FORMAT (SQUEEZE) | NOT APPLICABLE | ← WIDE MODE |
|  | 011 ····· 111 | RESERVED | | |
| 01 | 000 | 4:3 FULL FORMAT | NOT APPLICABLE | ← NORMAL MODE |
|  | 001 | 14:9 LETTER BOX | CENTRE | |
|  | 010 | 14:9 LETTER BOX | TOP | |
|  | 011 | 16:9 LETTER BOX | CENTRE | |
|  | 100 | 16:9 LETTER BOX | TOP | |
|  | 101 | >16:9 LETTER BOX | CENTRE | |
|  | 110 | 14:9 FULL FORMAT | CENTRE | |
|  | 111 | 16:9 FULL FORMAT (ANAMORPHIC) | NOT APPLICABLE | ← WIDE MODE |
| 10 ····· 11 | 000 ····· 111 | RESERVED | | |

⇩ CHROMINANCE PIXEL COUNT CONVERSION

⇩ 8/9 PIXEL COUNT CONVERSION (NORMAL MODE)

⇩ 4/3 PIXEL COUNT CONVERSION (WIDE MODE)

NTSC SYSTEM

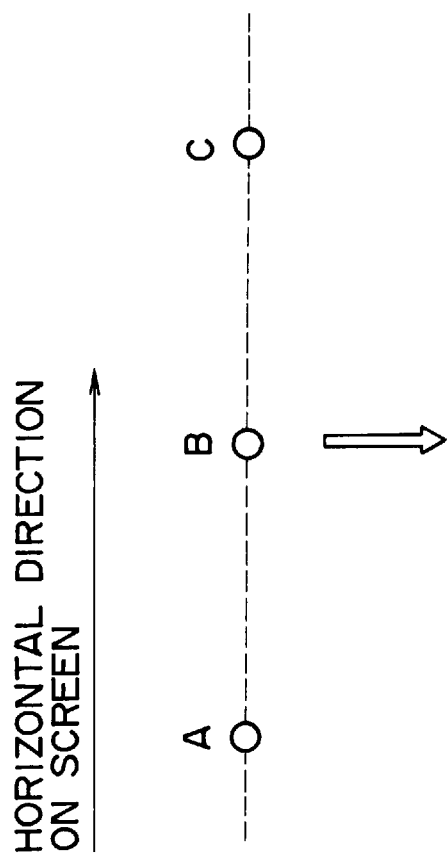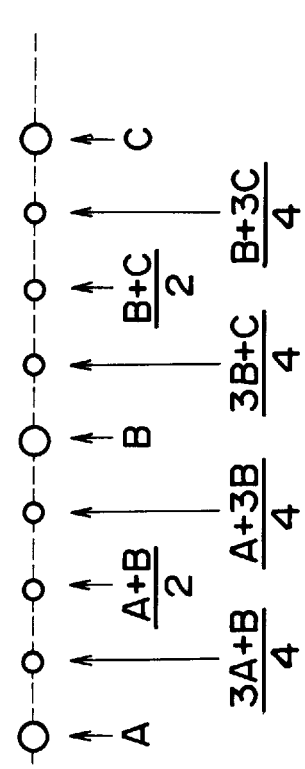
FIG. 17A INPUT DATA
FIG. 17B CONVERSION DATA
CHROMINANCE PIXEL COUNT CONVERSION (NTSC)

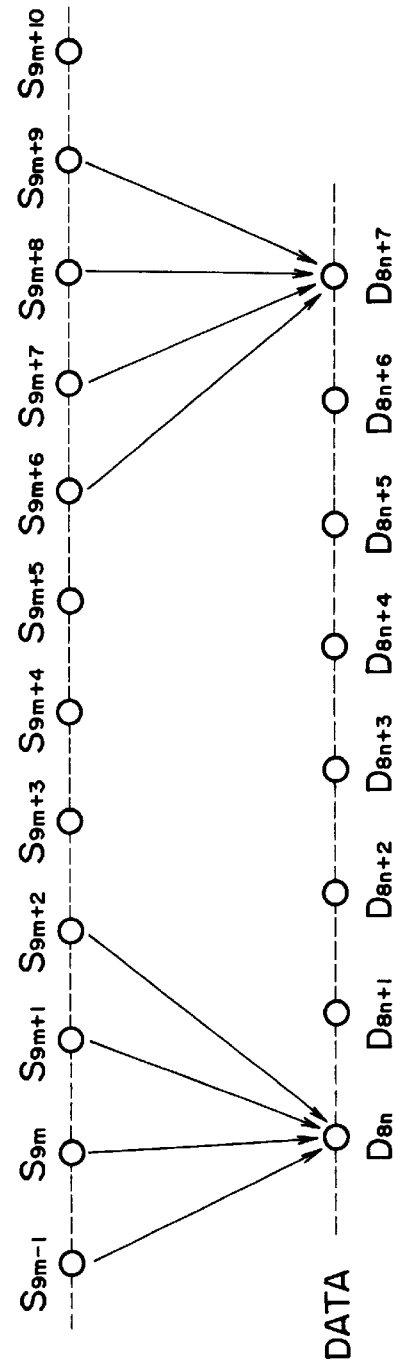

FIG. 19A   FIG. 19B   FIG. 19C
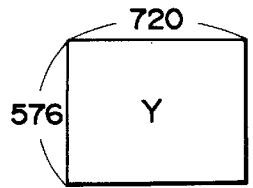 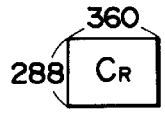 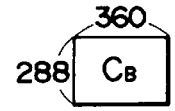
⇓ CHROMINANCE PIXEL COUNT CONVERSION
FIG. 20A   FIG. 20B   FIG. 20C
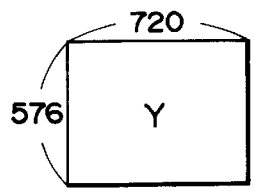 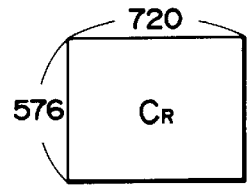 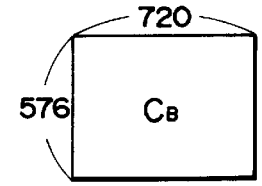
⇓ 16/15 PIXEL COUNT CONVERSION
FIG. 21A   FIG. 21B   FIG. 21C
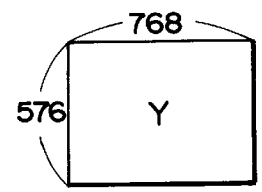 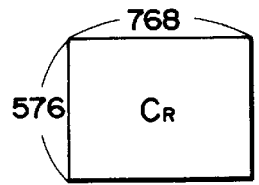 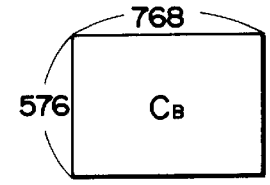
⇓ 4/3 PIXEL COUNT CONVERSION
FIG. 22A   FIG. 22B   FIG. 22C
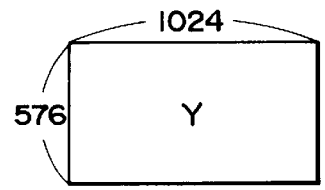 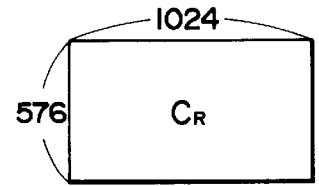 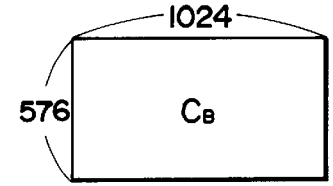
PAL SYSTEM

INPUT DATA

CONVERSION DATA

CHROMINANCE PIXEL COUNT CONVERSION (PAL)

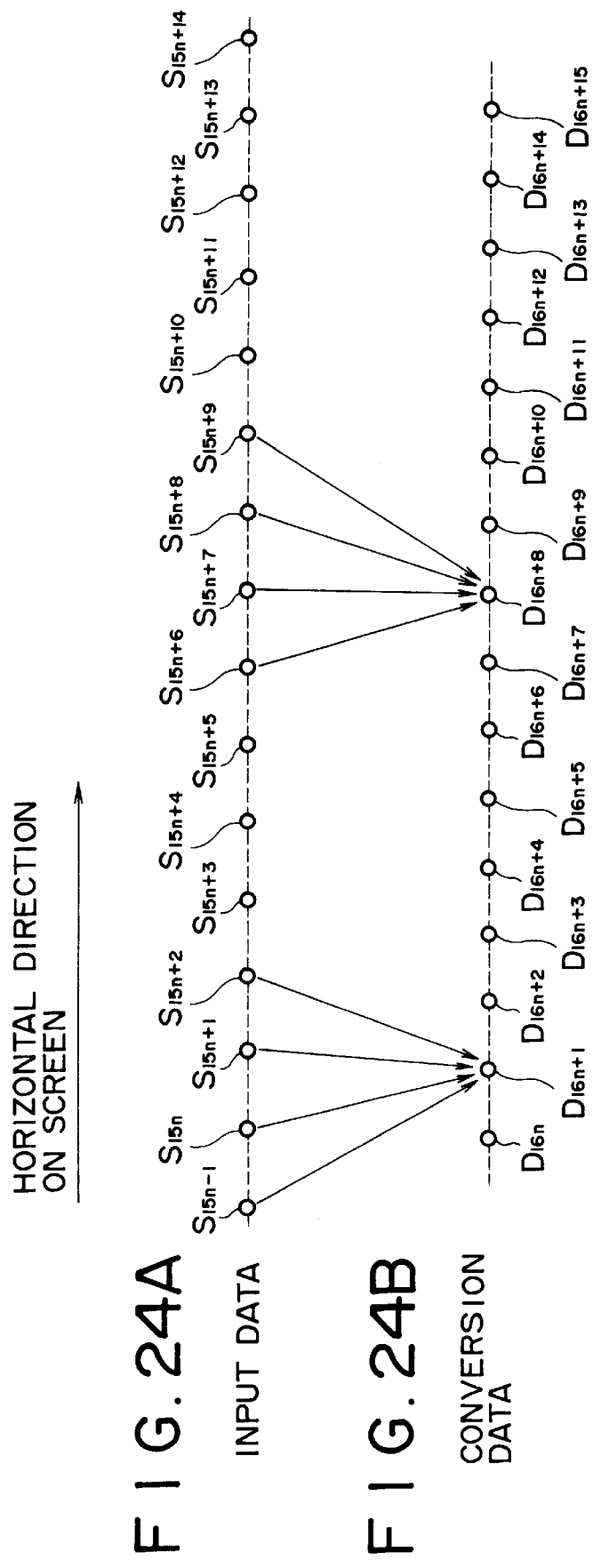

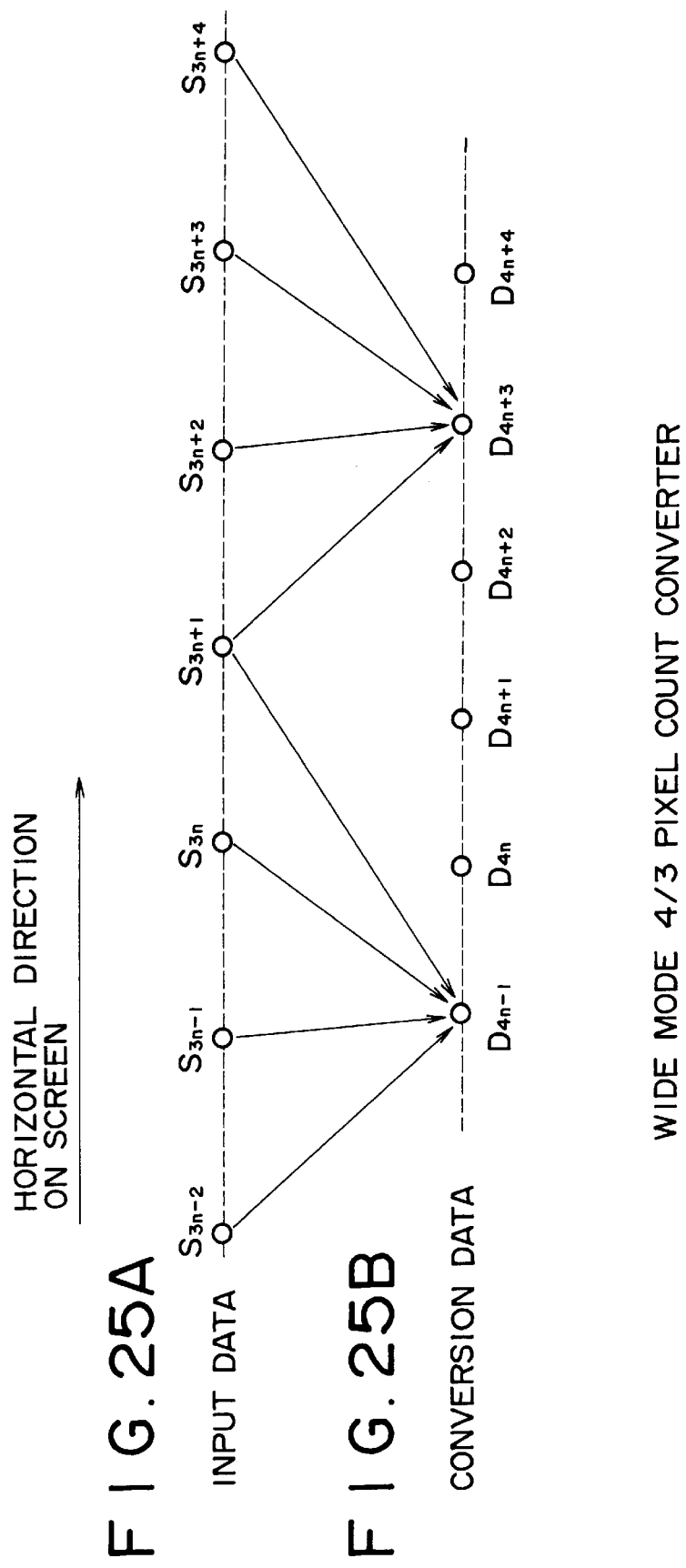

PROCESSING AND DISPLAY OF IMAGES RETRIEVED FROM DIGITAL STILL IMAGE FILES GENERATED FROM DIGITAL MOVING IMAGES

BACKGROUND OF THE INVENTION

The present invention is related to image signal processing and, in particular, to an apparatus and method for decoding compressed image data stored in a file and for displaying the decoded data as undistorted still images.

Previously, the inventors of the present invention have proposed an apparatus and method for generating digital still image files based on digital moving images. Namely, still frames of compressed video data are extracted from digital moving images that had been compressed according to a preselected video signal format. The frames are then stored as data files on a recording medium (such as a hard disk) of a computer. To display the still images on a monitor connected to the computer, the stored image data is retrieved from the files and decoded by processing operations corresponding to the preselected compression format.

It is noted that the image data contained in those files is extracted from the digital moving images that are processed in the following manner. In NTSC systems, for example, the luminance (Y) signal component is sampled at 13.5 MHz to obtain one frame of picture data containing 720 pixels in a horizontal direction by 480 pixels in a vertical direction. In this case, the aspect ratio of the display region occupied by one pixel is 8:9. Hence, in the file generated from the image data of the NTSC system as described above, the aspect ratio of the display region occupied by one pixel is 8:9. The aspect ratio of the picture, represented by an analog picture signal (after conversion from digital domain) and displayed on a typical television set, is 4:3.

In contrast, the aspect ratio of the display region occupied by one pixel on the computer monitor is typically 1:1.

Consequently, when the image file data is decoded and displayed on the computer monitor as a still image of 720 by 480 pixels, the horizontally extended deformed image (visually distorted picture) is displayed. This is the result of the picture being displayed with the 1:1 aspect ratio, while the actual aspect ratio is 8:9.

Similarly, the above problem exists in PAL systems as well. In particular, the number of pixels per one frame of data compressed according to a preselected digital video format is 720 (horizontal) by 576 (vertical); and the aspect ratio of the display region occupied by one pixel is 16:15. As a result, in the PAL system, the picture is displayed with an incorrect aspect ratio on the computer monitor having the 1:1 aspect ratio. That is, the image is visually distorted by appearing elongated in the vertical direction on the display screen.

Further, the digital video signal may be reproduced in the "normal mode" for displaying images with the 4:3 aspect ratio, and also in the "wide mode" for displaying images with the 16:9 aspect ratio. In the wide mode, one frame includes 720 horizontal pixels by 480 vertical pixels in the NTSC system just like in the normal mode, or 720 horizontal pixels by 576 vertical pixels in the PAL system. In both cases, the aspect ratio of the display region occupied by one pixel is horizontally elongated. When the wide mode still image is displayed on the computer monitor (as opposed to the television set), the image appears deformed (shrunk) in the horizontal direction. That is, the picture with the incorrect aspect ratio is obtained.

OBJECTS OF THE INVENTION

It is an object of the present invention to display an undistorted image based on moving image data.

It is another object of the present invention to display in various display modes an undistorted image based on moving image data.

It is yet another object of the present invention to display an undistorted image based on moving image data corresponding to any preselected television format.

It is still another object of the present invention to display an image with a correct aspect ratio on a computer screen.

It is a further object of the present invention to decode and display an undistorted image based on coded moving image data.

SUMMARY OF THE INVENTION

These and other objects, features and advantages are accomplished by an apparatus and method for displaying an image based on coded digital moving image data. In accordance with the present invention, image data, represented by frame data, is extracted from the coded digital moving image data. The extracted image data, defined by a predetermined number of pixels, is then decoded. Thereafter, the decoded image data is converted by selectively changing the predetermined number of pixels in a horizontal or vertical direction of the image. As a result, the image represented by the converted image data is displayed with a correct aspect ratio.

In accordance with one aspect of the present invention, a television system format corresponding to the image data is determined. Consequently, the predetermined number of pixels is changed on the basis of the television system format.

In accordance with another aspect of the present invention, a display mode corresponding to the image data is determined. The predetermined number of pixels is changed on the basis of the display mode.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which:

FIG. 1 is a block diagram of the image capturing/display system in accordance with the present invention;

FIG. 2 shows a display screen during a representative image processing operation according to the present invention;

FIG. 9 shows data structure of one data pack with reference to VAUX Source information;

FIG. 10 is a table for defining VAUX Source;

FIG. 11 shows data structure of one data pack with reference to VAUX Source Control information;

FIG. 12 is a table for defining VAUX Source Control;

FIGS. 17A and 17B are diagrams of the filtering operation during the chrominance pixel count conversion in the NTSC system;

FIGS. 18A and 18B are diagrams of the filtering operation during the 8:9 pixel count conversion in the NTSC system;

FIGS. 19A–19C show, in block diagram form, the number of pixels in one frame of the signal component data in the PAL system;

FIGS. 20A–20C show, in block diagram form, the number of pixels in one frame of the signal component data after the chrominance pixel count conversion in the PAL system;

FIGS. 21A–22C show, in block diagram form, the number of pixels in one frame of the signal component data after the 16:15 pixel count conversion in the PAL system;

FIGS. 22A–22C show, in block diagram form, the number of pixels in one frame of the signal component data after the 4:3 pixel count conversion in the PAL system;

FIGS. 24A and 24B are diagrams of the filtering operation during the 16:15 pixel count conversion in the PAL system;

FIGS. 25A and 25B are diagrams of the filtering operation during the 4:3 pixel count conversion in the wide mode.

In all Figures, like reference numerals represent the same or identical components of the present invention.

DETAILED DESCRIPTION OF THE PREFERRED EMBODIMENTS

Figures 3A, 3B:
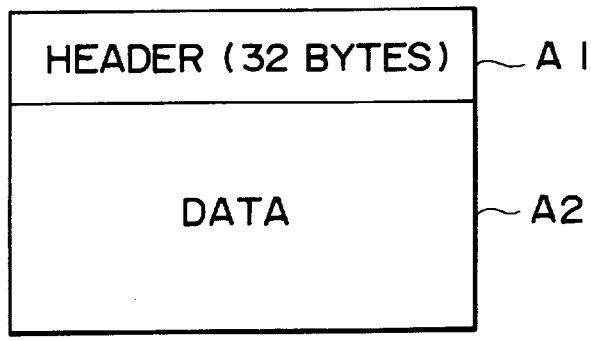
FIG. 3A shows data structure of the image file in accordance with the present invention.
FIG. 3B shows, in detail, a header of the image file.

As a general overview, the present invention includes, as part of the computer, a picture capturing board for directly capturing the image signal information of moving images supplied from the digital VTR as a digital signal, and for generating a data file from the captured still image (hereinafter referred to as image file). Also included are a process controller installed in the computer and connected to the picture capturing board for generating the image file from the input signal data, and software for displaying, under control of the process controller, an image based on the generated image file.

The present invention will now be described in the following order:

1. Structure of the image capturing/display system.
2. Image capturing operation.
3. Format of the image file.
4. Signal processing for displaying an image based on the image file data.
5. Detection of the NTSC/PAL systems and normal/wide mode.
6. Pixel conversion in the NTSC system (normal mode).
7. Pixel conversion in the PAL system (normal mode).
8. Pixel conversion in the wide mode.
9. Pixel conversion sequencing flowchart.

1. Structure of the Image Capturing/Display System.

FIG. 1 is a block diagram of the image capturing/display system in accordance with the present invention. A digital VTR 1 may be a digital camcorder for generating images and recording them on a tape recording medium (8 mm tape cassette, for example) as moving image digital signals. The VTR 1 directly outputs the image information (which may be reproduced from the tape recording medium, for example) through the digital picture signal output terminal (referred to as DV terminal hereinafter) 1*a* as a digital signal.

The detailed description of the format of the image data produced by the VTR 1 is omitted. Suffice it to say that the image data is generated by sampling the picture signal according to a preselected format (i.e., video transmission standard). The format of the picture signal data which is recorded and/or reproduced by the VTR 1 is referred to as DV format hereinafter.

A computer 2 generates a still image from the moving images supplied by the VTR 1 and stores the still image in a data file. As shown in FIG. 1, the still image retrieved from the data file is then displayed on a monitor connected to the computer 2.

The computer 2 has, among other things, an image capturing board 3 for receiving—via a DV terminal 3*a*—image data from the VTR 1. The system, as represented by this embodiment, can directly process the input images without conversion to analog domain. For example, an IEEE 1394 digital serial bus may be adopted as the network standard for transferring the digital moving image data between the VTR 1 and the computer 2 via the DV terminals 1*a* and 3*a*, respectively.

Further shown in FIG. 1 is a programmable controller 4 for controlling various operations of the computer 2. An image capture/display program 4*a* is stored in a data storage area of the controller 4: the program 4*a* instructions are executed by the controller 4, thereby causing the image capturing operation to be carried out by the image capturing board 3. A Random Access Memory (RAM) 4*b* stores data in connection with the instruction execution by the controller 4. It will be appreciated that the image capturing board 3 and the image capture/display program 4*a* may be available in combination (as a set, for example).

FIG. 1 also shows recording/reproducing means 5 for controlling reading/writing operations for each of the image files to/from a recording medium 6. In one particular embodiment, an internal disk drive is used as the recording/reproducing means 5; however, other driver devices may be used for recording/reproducing information on a hard disk, a floppy disk or other storage media.

In accordance with operating instructions of the controller 4, a display driver 7 converts the picture information from the image files to an RGB signal, for example. A monitor 9 then displays images based on the RGB signal supplied from the display driver 7.

According to one aspect of the present invention, input means 10 (e.g., a keyboard, a mouse, etc.) is connected to the computer 2 such that commands from the user-manipulated input means 10 are supplied to the controller 4 via a keyboard interface 8. An appropriate processing operation is then executed in accordance with the operational commands entered at the input means 10.

2. Image Capturing Operation.

Next, representative user operations for capturing a still image from the moving images will be described with reference to FIG. 1. Initially, the user connects the computer 2 (having the image capturing board 3) and the VTR 1 via a cable, etc., between DV terminals 1a and 3a. The image capture/display program 4a is then activated by operating a particular input key of the input means 10 so that the image capturing operation is initiated. When the user causes the playback operation of the VTR 1 to start in this manner, the played-back image information is supplied to the computer 2 as a digital signal via the DV terminals 1a and 3a.

FIG. 2 shows a display screen P for the image capturing operation displayed on the monitor 9 while the image capture/display program 4a is being executed. For example, when the playback operation of the VTR 1 is initiated as described above, the program 4a generates display image information for a candidate frame of the VTR-transmitted input moving images to be captured as a still image. The moving image information is displayed in a moving image display window W1 in the upper left-hand corner of the display region as shown in FIG. 2. That is, the digital data currently being played back by the VTR 1 is displayed in the window W1 as moving images. When the desired scene is to be captured, the image is designated as such by the user while viewing the moving images in the window W1. For example, a cursor (not shown in the figure) may be positioned on an image capturing key display K for image capturing use, and then a mouse button, confirming the selection of the desired image, is clicked. When this is done, the appropriate instructions in the program 4a are executed to capture the frame image displayed in the window W1 for which the above operation had been carried out. As a result, the still image file is created and stored to the recording medium 6.

In FIG. 2, a captured image display window W2 is provided so that the user can distinguish between a plurality of generated image files. Namely, an image file icon I for selecting the still image files, is displayed for user control according to the sequential (or random, if preferred) capturing operation of the images, for example.

3. Format of the Image File.

As stated above, the image data transmitted according to the recording format of the VTR 1 is captured as the still image and then stored in a file for subsequent processing by the computer 2.

In particular, in the image capturing board 3, image data is extracted from the digital data transmitted through the DV terminal 3a and is written to internal memory (RAM 4b) in units of picture frames. The frame data is then retrieved at predetermined timing from RAM 4b and supplied to the controller 4 through a bus line of the computer 2. The controller 4 executes the instructions of the image capture/display program 4a to generate an image file, based on the retrieved frame data as indicated by the user in accordance with the operation of FIG. 2. The image file is subsequently stored to the recording memory 6.

FIG. 3A shows the data structure of an image file containing one still image (one frame). The image file begins with a header area A1 comprising 32 bytes. The header area A1, arranged in four-byte portions, stores various file management information (as described below with reference to FIG. 3B) for use in managing the image files recorded on the recording medium.

Next, a data area A2 is provided for the image data, where data is arranged in two-byte units. The data area A2 contains one frame of the image data. If the video broadcast format is NTSC-compatible (SD525), 1490 data blocks from 10 tracks are arranged sequentially (i.e., tracks 0 through 9 are recorded on the magnetic tape). If the format is PAL-compatible (SD625), 1490 data blocks from 12 tracks are arranged sequentially (i.e., tracks 0 through 11). The size of the image file is, therefore, constant: in the SD525 format, it is 32 (bytes)+149 (blocks/track)*80 (bytes/block)*10 (tracks)=119232 bytes; and in the SD625 format, it is 32 (bytes)+149 (blocks/track)*80 (bytes/block)*12 (track)= 143072 bytes.

The image data outputted by the VTR 1 via the DV terminal 1a undergoes the predetermined compression processing/coding operations. As understood from the above description, the image file contains one frame of the compression-processed image data. Consequently, the size of the image file is small, and the recording capacity of the recording medium is efficiently utilized during the image file storage.

FIG. 3B shows the data configuration of the header area A1. As shown in the figure, the 32 byte header area A1 is divided into file identifier area A11, file version area A12, format detail information area A13, data attribute area A14, file size area A15, data size area A16, offset-to-data area A17, and undefined area A18 (8 bytes).

The area A11 is represented by four bytes of ASCII code for file identification, and, for example, in the system of the present embodiment, is set to "DVF". The file version area A12 defines the file version using four bytes of ASCII code and is set to "1.00" for the 1.00 version, for example. The area A13 indicates a format, selected from various television formats as adopted by the industry, using three bytes of ASCII code. Two exemplary codes used in this embodiment are "SD5" for the SD525 format, and "SD6" for the SD625 format. In this embodiment, only the SD525 and SD625 formats are described. It is understood, of course, that in addition to these two formats, at least four types of other formats may be used: SDL525, SDL625, HD1125 (high definition NTSC-compatible) and HD1250 (high-definition PAL-compatible) represented, for example, as "SL5", "SL6", "H11" and "H12", respectively, by ASCII codes. The data attribute area A14 stores prescribed information showing the attributes relating to the image file, using one data byte. This area is utilized to store binary 0 or 1 according to the attributes set up for each of the eight bits for which the required attribute data is defined. The file size area A15 defines the data size of the entire image file, using four bytes of the binary code. As stated above, the image file size in the SD525 format is 119232 bytes, which is "0001D1C0" in hexadecimal notation. Further, the data size of the image file in the SD625 format is 143072 bytes, which is "00022EE0" in the hexadecimal notation. The data size area A16 represents the size of the data area A2 using four bytes (in binary). If the transmission format is SD525, the data size is 119200 bytes (119232−32=19200) denoted as "0001D1A0" in the hexadecimal notation. If, on the other hand, the transmission format is SD625, the data size is 143040 bytes (143072−32=143040) designated as "00022EC0" in the hexadecimal numbering system. The data offset area A17 defines the offset to the data area A2 from the header area A1 (that is, the end position of the header area from the start of the image file) using four bytes (in binary). In this case, the offset-to-data is 32 bytes ("00000020" in the hexadecimal notation). If, for example, it becomes necessary to increase the number of items (areas) in the header area A1 requiring more than 32 bytes, the data offset area A17 may be changed accordingly, thereby providing compatibility with future format changes, etc.

By executing the instructions of the program 4a, image files based on the captured image data are generated by the controller 4 according to the current system-in-use (NTSC or PAL). Namely, with respect to the frame data supplied to the controller 4 from the image capturing board 3, the definitional contents of each area (A11–A18) corresponding to the supplied image type (NTSC standard, PAL standard, etc.) are provided to the header area A1 that is added to the file, and the image file of the structure shown in FIG. 3A is thus generated. An appropriate file name is then given to the image file that is recorded (saved) to the recording medium 6.

4. Signal Processing for Displaying an Image Based on the Image File Data.

Under control of the controller 4, the image capture/display program 4a generates an image file and stores it to the recording medium 6 as described above. Thereafter, the image file is retrieved from the recording medium 6, and the image file data is displayed on the monitor 9 as desired by the user. Those operations are also performed in accordance with the executed instructions of the program 4a.

Since the picture data of the image file (data area A2 of FIG. 3A) is compressed according to the predetermined digital video format, it is necessary to decode the image file data in order to display it on the monitor 9.

Figure 4:
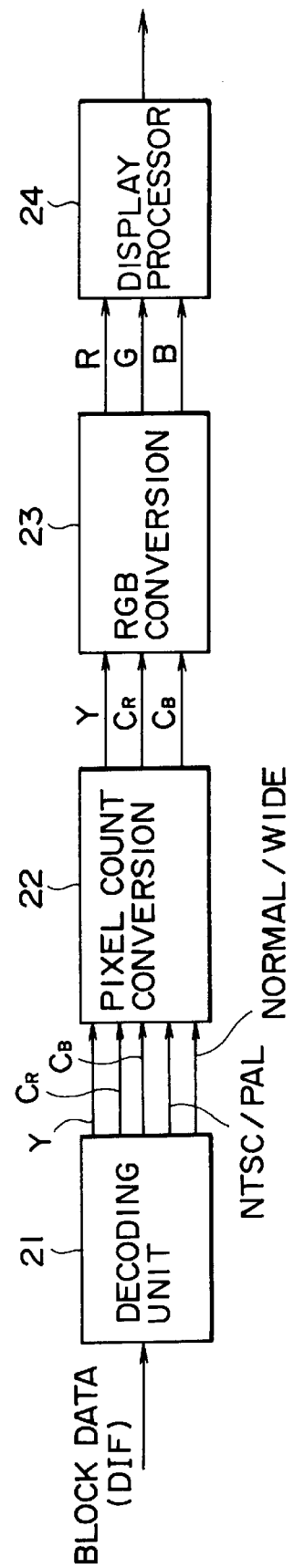
FIG. 4 is a block diagram for displaying an image stored in the image file.

FIG. 4 is a functional block diagram for displaying an image stored in the image file in accordance with the processing operations of the image capture/display program 4a. As shown in FIG. 4, the data retrieved from the image file stored on recording medium 6 is supplied to decoding unit 21. The image file data is arranged in digital interface (DIF) blocks, described in detail hereinafter with reference to FIG. 6.

The decoding unit 21 decodes the image file data to generate the sample data of a luminance signal component (Y signal data), the sample data of a R-Y chrominance signal component ($C_R$ signal data), and the sample data of a B-Y chrominance signal component ($C_B$ signal data). The Y, $C_R$ and $C_B$ signal data (referred to as signal component data) is then supplied to a pixel count converter 22.

As shown in FIG. 4, the decoding unit 21 supplies the NTSC/PAL identification signal for determining whether the image file data should be displayed in accordance with the NTSC or PAL television system. Also provided from the decoding unit 21 to the pixel count converter 22 is the normal/wide identification signal for indicating the image display mode: the normal mode (4:3 aspect ratio) or the wide mode (16:9 aspect ratio). The identification between the NTSC/PAL systems and between the normal/wide modes based on the DIF block data will be described hereinafter.

The pixel count converter 22 functions as a Low Pass Digital Filter (LPDF). In particular, the pixel count converter 22 processes the signal component data for one frame in accordance with the NTSC/PAL standard and the normal/wide display mode based on the NTSC/PAL identification signal and normal/wide mode identification signal. One representative processing of the pixel count converter 22 includes changing the number of horizontal pixels in the frame, as explained in detail below.

As mentioned earlier, if the image file is displayed on a display device of the computer system without the pixel count conversion processing by the above-mentioned pixel count converter 22, the incorrect aspect ratio is obtained. Even though the aspect ratio of the portion occupied by one pixel is 1:1 on the display screen of the monitor 9, the aspect ratio of the signal component data is not 1:1 (8:9 for the NTSC system and 16:15 for the PAL system, for example).

Due to the pixel conversion by the pixel count converter 22 in accordance with the present invention, the image file data is displayed with the correct aspect ratio on the monitor 9 without any picture distortion.

Continuing with the description of FIG. 4, the signal component data after the pixel count conversion is supplied to RGB converter 23 for generating RGB signals. The generated RGB signals are then supplied to a display processor 24 for displaying the still image in the captured image display window W2 on the display screen P of the monitor 9. The display processor 24 controls the display driver 7 in accordance with the executed instructions of the image capture/display program 4a. It will be appreciated that various display modes are known in the art, and the description thereof will be omitted for brevity.

Figure 5:
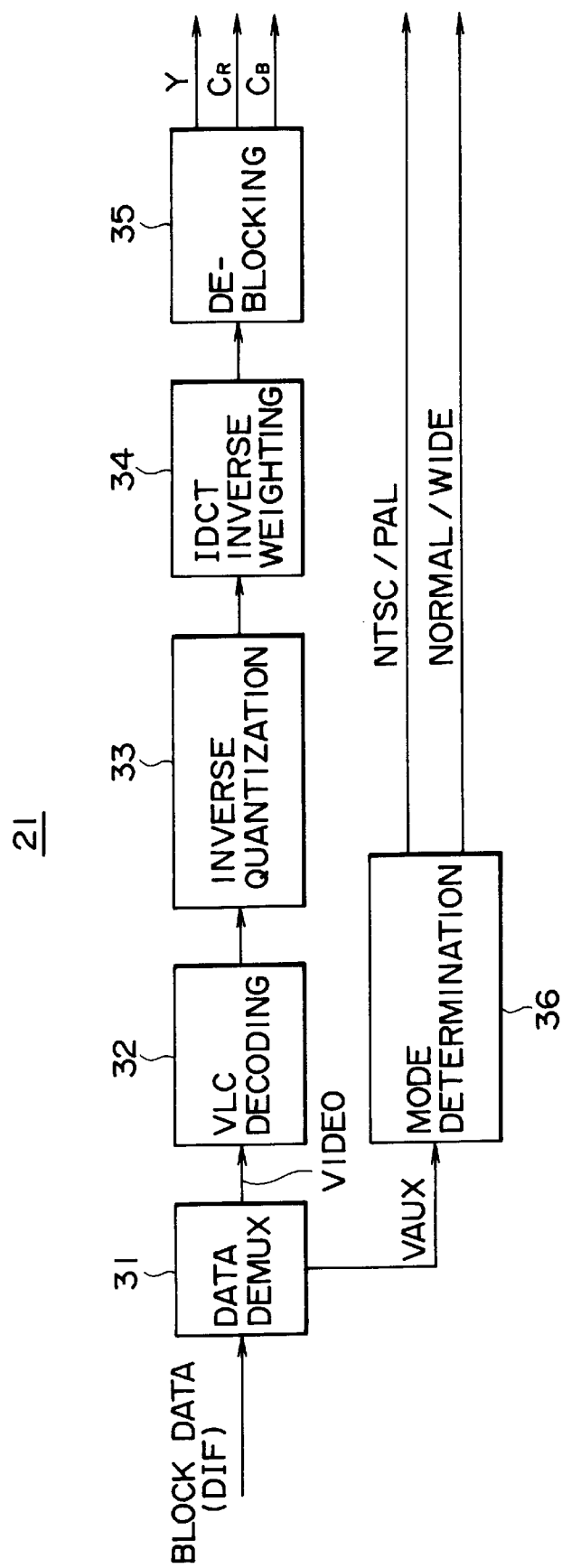
FIG. 5 is a detailed block diagram of a decoder according to the present invention.

FIG. 5 is a detailed block diagram of the decoding unit 21 of FIG. 4. As shown in this figure, the image file data (in DIF blocks) is sent to a data demux 31. The image file data (i.e., the data of the data area A2 shown in FIG. 3A) that is supplied to the data demux 31 includes four types of the DIF blocks: Subcode block, VAUX block, Audio block, and Video block as will be described hereinafter with reference to FIG. 6.

The data demux 31 selects the data from the Video blocks (extracted from the above-mentioned four types of the DIF blocks) that are required to display an image, and supplies the selected data to VLC decoder 32. In addition, the data demux 31 supplies the data from the VAUX blocks, extracted from the above-mentioned four types of the DIF blocks, to mode determination unit 36. As will be explained in detail below, the VAUX block data contains information on the type of the television system (NTSC or PAL) and display mode (normal or wide) associated with the image file data.

It will be appreciated that during the coding operation of the data compression, the moving image data was converted by Discrete Cosine Transform (DCT), quantized, and subjected to the variable length coding (VLC). Hence, VLC decoder 32 decodes the input video block of the VLC coded data. Then, inverse quantizer 33 performs the inverse quantization of the VLC decoded data using the inverse quantization coefficients corresponding to the quantization coefficients used in the quantization of data during the compression processing operation.

As shown in FIG. 5, the expanded data is further supplied to Inverse Discrete Cosine Transform (IDCT)/Inverse Weighting unit 34. The IDCT/Inverse Weighting unit 34 performs the inverse DCT processing, including the inverse weighting operation, by providing inverse weighting coefficients corresponding to the weighting coefficients during the DCT operation of the compression processing. As a result of the above-described operations with reference to FIG. 5, the image data substantially the same as the image data prior to the compression is obtained.

Further, according to the digital video format, pixels of one sampled frame are formed into blocks (8 pixels by 8 pixels) corresponding to the basic processing unit of the DCT conversion for each Y, $C_R$, and $C_B$ signal component data during the data compression. Then, four blocks of the Y signal component data and one of each of the $C_R$ and $C_B$ signal component data (associated with the same position and area on the display screen) form a macro-block.

Hence, the data outputted from the IDCT/Inverse Weighting unit 34 is arranged in macro blocks based on the above-mentioned (8 by 8 pixels) blocks. Deblocking unit 35 rearranges the data supplied from the IDCT/Inverse Weighting unit 34 to generate Y, $C_R$ and $C_B$ signal data as shown in FIG. 5, and outputs it to the pixel count converter 22 of FIG. 4.

It will be appreciated that the signal processing operations performed by the above-described means (from the VLC decoder 32 to the deblocking unit 35) for decoding compressed image data may be realized by software instead of hardware. Prior to be displayed on the display device, the decoded image data is converted to the analog form, however.

5. Detection of the NTSC/PAL Systems and Normal/Wide Mode.

The pixel count conversion performed by the pixel count converter 22 of FIG. 4 is a function of the type of the image file data, namely whether the television standard is NTSC or PAL and whether the display mode is normal or wide for each of these respective systems.

As stated above, the mode determination unit 36 of FIG. 5 determines whether the image file data corresponds to the NTSC or PAL system and to the normal or wide mode. Prior to the detailed description of the processing operations of the mode determination unit 36, however, the structure of the image file data (i.e, the DIF blocks) at the input of the decoding unit 21 is described with reference to FIG. 6.

Figure 6:
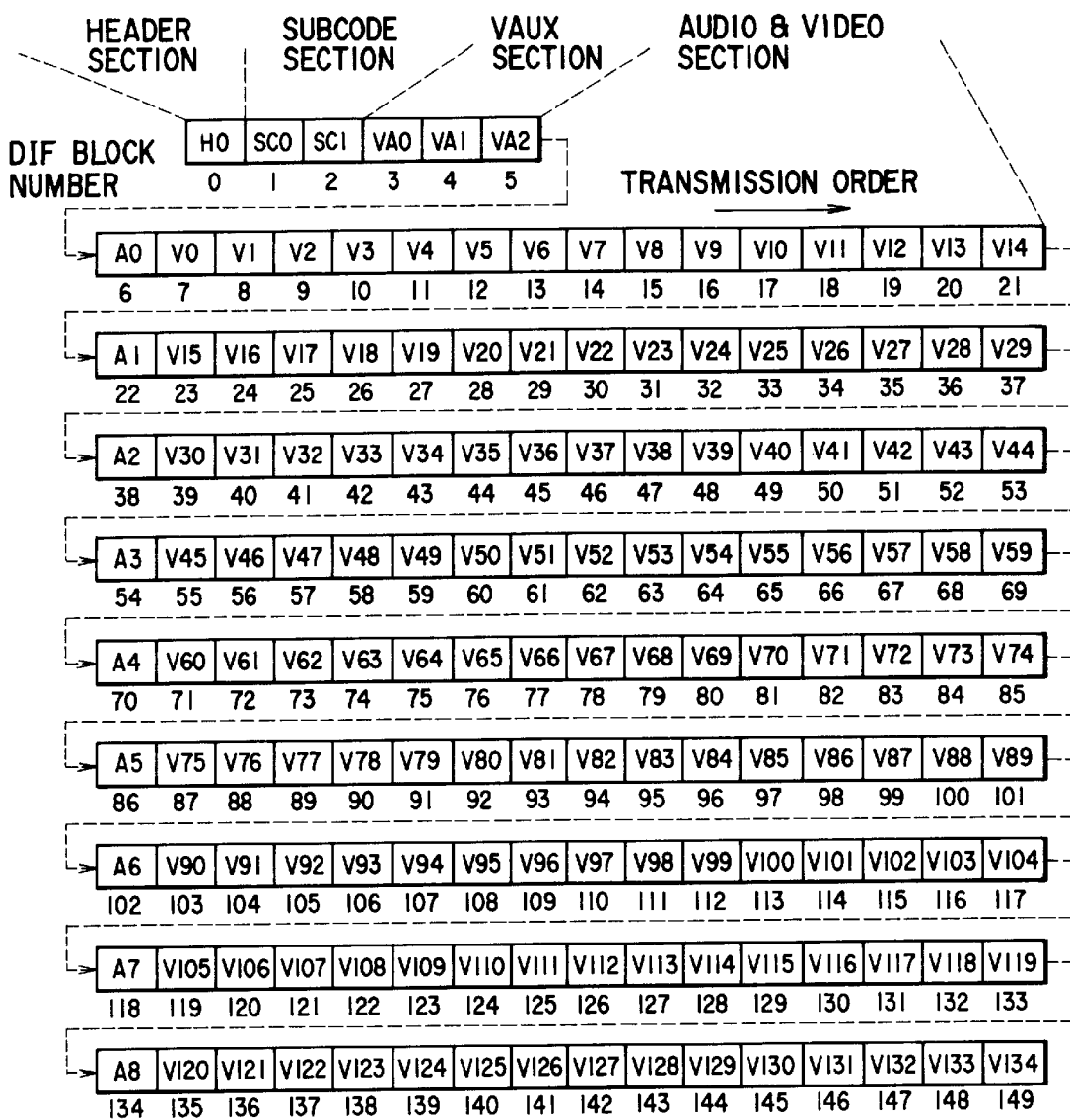
FIG. 6 illustrates data structure of one track of image data.

FIG. 6 shows the structure of one track of compressed image data according to the digital video format recorded on a magnetic tape. The individual data units delineated by solid lines are DIF blocks: one DIF block contains 80 bytes. The effective data of one track has 149 DIF blocks which are consecutively numbered 1 through 149 in FIG. 6.

The first DIF block with the number 0 (shown as "H0") is a header for indicating the starting position of each track when the compressed image data is transmitted from the VTR 1 in accordance with a preselected transmission standard (for example, IEEE 1394 standard). This header block is absent if no data is recorded on the magnetic tape or when the data is converted to the image file data.

The data sequence within one track (i.e, the data transmission order) is indicated by the dashed arrow in FIG. 6. Namely, the track data is transmitted in the ascending order of the DIF block numbers.

Two Subcode blocks (SC0 and SC1), three VAUX blocks (VA0–VA2), nine Audio blocks (A0–A8), and 135 Video blocks (V0–V134) are the DIF blocks constituting one track.

Data such as time codes, etc., are recorded in the Subcode block, while various management and information data relating to the image signal may be found in the VAUX block. The Audio block includes audio signal data and AAUX data: AAUX data has various control and information associated with the audio signal data. The Video block contains the image signal data.

As stated above, two exemplary formats (namely, SD525 based on the NTSC system and SD625 based on the PAL system) may be used as the recording formats by the VTR 1. In the SD525 format, 10 tracks of data on a magnetic tape form one frame, while in the SD625 format, 12 tracks form one frame. The data size for one frame portion in the SD525 format, therefore, becomes:

80 (bytes/block)*149 (blocks/track)*10 (tracks)=119200 bytes

The data size for one frame portion in the SD625 format is:

80 (bytes/block)*149 (blocks/track)*12 (tracks)=143040 bytes.

The image file of a still picture generated by executing the instructions of the image capturing program 4a contains one frame of data compressed according to the digital video format as described above. In particular, in the NTSC system, the image file has (in the data area A2 as shown in FIG. 3A) the data from 10 tracks in which each track has 149 blocks, as previously described with reference to FIG. 6. Similarly, in the PAL system, 12 tracks of data are stored in the image file.

The data from the data area A2 of FIG. 3A, is supplied to the decoding unit 21 (i.e., the data demux 31 of FIG. 5) in the block order as shown in FIG. 6 (i.e., the transmission order of the DIF blocks for one track). With respect to tracks, the data is transmitted according to track numbers of those tracks which form one frame.

Figure 7:
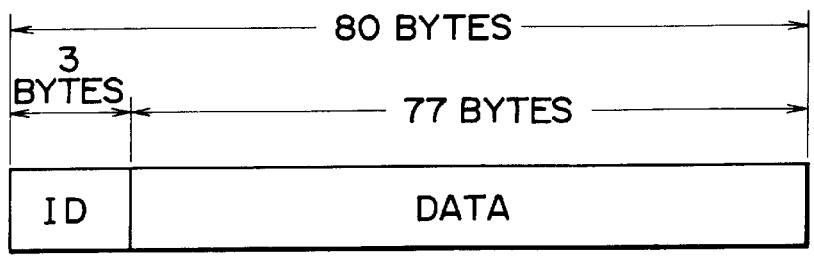
FIG. 7 illustrates data structure of one VAUX block recorded on the track.
Figure 8:
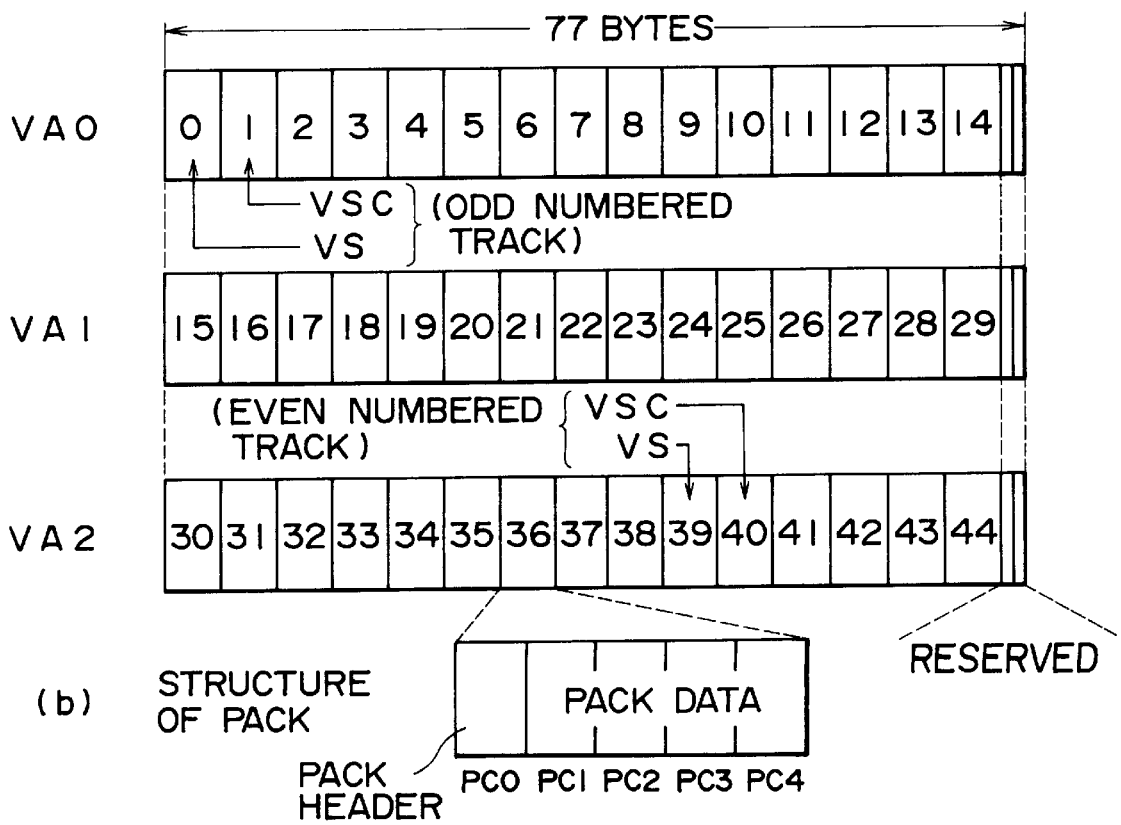
FIG. 8 illustrates the data area of the VAUX block.

FIGS. 7 and 8 show the data structure of the VAUX block. As shown in FIG. 7, the VAUX block includes the head ID area of 3 bytes and subsequent data area of 77 bytes. FIG. 8 shows in detail the structure of the data area composed of 15 data units of 5 bytes each (referred to as a pack) and a reserved area of 2 bytes.

Referring for the moment to FIG. 6, three VAUX blocks (VA0–VA2) are located consecutively at the DIF block positions numbered 3 through 5, respectively, in each track. Therefore, a total of 45 packs are included in the VAUX blocks VA0 through VA2 in each track, and are consecutively numbered 0 through 44 in FIG. 8.

As further shown in FIG. 8, one pack includes 5 areas: PC0–PC4 of 1 byte each. The PC0 is the pack header, and the 4 bytes PC1–PC4 are the pack data areas.

According to the present invention, VAUX Source is defined by the VAUX data that includes the information for indicating whether the image file data conforms to the NTSC or PAL standards. VAUX Source Control is defined by the VAUX data that includes the information for indicating whether the image file data is based on the normal or wide display mode.

VAUX Source and VAUX Source Control (represented by VS and VSC, respectively, in FIG. 8) are stored in the VAUX blocks (VA0–VA2) at the positions occupied by the packs 0 and 1, respectively, for odd numbered tracks. Packs 39 and 40 store VS and VSC, respectively, for even numbered tracks.

FIG. 9 shows the data structure of one data pack pertaining to the VAUX Source information. The correspondence of the image file data to either the NTSC or PAL system is indicated in the PC3 by one bit labeled "50/60" (the third bit from the most significant bit (MSB)) and by the following 5 bits labeled "Stype".

As illustrated, for example, by the table in FIG. 10, "Stype" binary value of "00000" and "50/60" binary value of "0" indicate "525-60 system" (namely, the NTSC system), while "Stype" binary value of "00000" and "50/60" value of binary "1" indicate "625-50 system" (namely the PAL system). The description of the rest of the table in FIG. 10 is self explanatory and is omitted for brevity.

FIG. 11 shows the data structure of one data pack pertaining to the VAUX Source Control information. The correspondence of the image file data to the normal or wide mode is indicated by the combination of the data in the "DISP" area of the lower three bits in the PC2 and the data in "BCSYS" area of the lower 2 bits in the PC3.

According to the table in FIG. 12, for example, the aspect ratio and format corresponding to the normal and wide modes are defined by the combination of the "BCSYS" and "DISP". In the present embodiment, only four display modes are described as the combination of binary values of BCSYS and DISP, respectively, as follows:

(00, 000)—4:3 full format (00, 010)—16:9 full format (squeeze)

(01, 000)—4:3 full format (01, 111)—16:9 full format (anamorphic)

The combination of the BCSYS and DISP values of (00, 000) or (01, 000) for the 4:3 full format is assigned to the normal mode, while the combination of the BCSYS and DISP values of (00, 010) or (01, 111) of the 16:9 full format is assigned to the wide mode.

The VAUX blocks (VA0–VA2) are selected by the data demux 31 and supplied to the mode determination unit 36, as shown in FIG. 5.

The mode determination unit 36 extracts the bits representing VAUX Source and VAUX Source Control with the above-mentioned data structure. Based on this extracted data, the mode determination unit 36 determines the correspondence of the image file data to either the NTSC system or PAL system by referring to the data in the "50/60" and "Stype" areas defining VAUX Source, as described above. The NTSC/PAL identification signal for indicating whether the image file data is in accordance with the NTSC system or PAL system is then generated.

Similarly, the mode determination unit 36 determines whether the image file data is to be displayed in the normal or wide mode by referring to the data in the "BCSYS" and "DISP" areas defining VAUX Source Control. A normal/wide identification signal for indicating the normal mode or wide mode is then produced based on the determination result. These two signals (the NTSC/PAL identification signal and normal/wide mode identification signal) are supplied to the pixel count converter 22.

6. Pixel Conversion in the NTSC System (normal mode).

Next, the pixel count conversion by the pixel count converter 22 of FIG. 4 is described. The pixel count converter 22 performs a representative processing on the image file data in the NTSC or PAL system for display in the normal or wide mode based on the NTSC/PAL identification signal and normal/wide identification signal supplied from the mode determination unit 36, as described above.

Figures 13A, 13B, 13C:
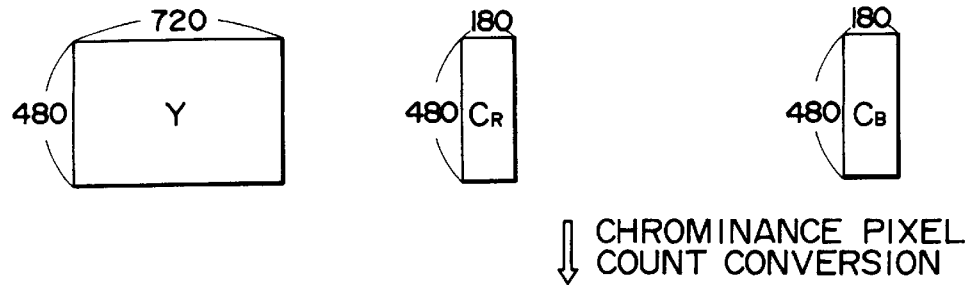
FIGS. 13A–13C show, in block diagram form, the number of pixels in one frame of the signal component data in the NTSC system.

Initially, the pixel count conversion for the image file data in the NTSC system for display in the normal mode is described. FIGS. 13A–13C show the signal component data for one frame (in the NTSC system) which was decoded and outputted from the decoding unit 21. In particular, FIG. 13A shows one frame of the Y signal data containing 720 (horizontal) by 480 (vertical) pixels (i.e., sample data). FIGS. 13B and 13C show one frame of the $C_R$ and $C_B$ signal data (i.e., chrominance signal data), each containing 180 (horizontal) by 480 (vertical) pixels.

The pixel count converter 22 converts the $C_R$ and $C_B$ signal data in order to make the number of pixels the same as in the Y signal data. Namely, the number of pixels in the horizontal direction is changed from 180 to 720 for the $C_R$ and $C_B$ signal data (i.e., the $C_R$ and $C_B$ signal data of FIGS. 13B and 13C is changed to the $C_R$ and $C_B$ signal data of FIGS. 14B and 14C). The Y signal data shown of FIG. 14A remains the same as the Y signal data of FIG. 13A.

FIGS. 17A and 17B are diagrams of the chrominance pixel count conversion in the NTSC system. FIG. 17A shows three chrominance pixels A, B, and C (arranged in the horizontal direction on the screen) which are input to the pixel count converter 22. The pixel count converter 22 interpolates these three pixels as follows: (A+B)/2, (3A+B)/4, and (A+3B)/4. The additional pixels are obtained as a result of these calculations pertaining to the A and B pixels only (as shown in FIG. 17B) by performing digital filtering operations for the chrominance pixel count conversion. Similarly, the pixel count converter 22 interpolates another three pixel as follows: (B+C)/2, (3B+C)/4, and (B+3C)/4, which are obtained from the B and C pixels.

The number of pixels in the chrominance signal data in the horizontal direction becomes 4 times the original number of pixels due to such interpolation processing. As a result of this pixel count conversion, the signal data shown in FIGS. 13B and 13C changes to the signal data of FIGS. 14B and 14C.

Figures 14A, 14B, 14C:
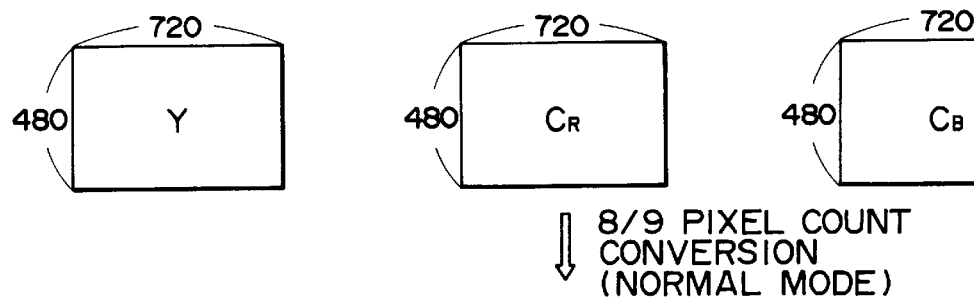
FIGS. 14A–14C show, in block diagram form, the number of pixels in one frame of the signal component data after the chrominance pixel count conversion in the NTSC system.
Figures 15A, 15B, 15C:
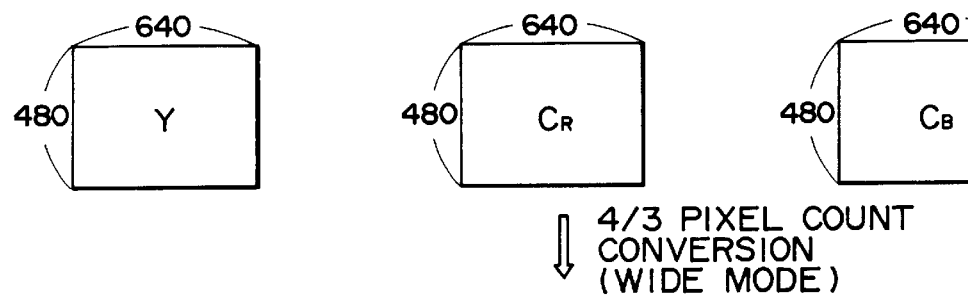
FIGS. 15A–15C show, in block diagram form, the number of pixels in one frame of the signal component data after the 8:9 pixel count conversion (normal mode) in the NTSC system.

After the component signal data having the number of pixels as shown in FIGS. 14B and 14C is obtained by the chrominance pixel count conversion, another pixel count conversion is performed so that the component signal data shown in FIGS. 14A, 14B, and 14C is changed to that shown in FIGS. 15A, 15B, and 15C. In particular, the number of pixels in the horizontal direction of the Y, $C_R$ and $C_B$ signal data, respectively, is converted from 720 to 640. Since 640/720=8/9, the pixel count conversion is referred to as the 8:9 pixel count conversion. The 8:9 pixel count conversion is performed because the aspect ratio of the region occupied by one pixel is 8:9 in the normal display mode of the NTSC system, as described hereinbefore.

FIGS. 18A and 18B are diagrams of the filtering operation during the 8:9 pixel count conversion in the NTSC system. FIG. 18A shows representative pixels $S_{9m-1}$ through $S_{9m+10}$ arranged in the horizontal direction, which constitute the component signal data as shown in FIGS. 14A–14C. The digital filter performs the operations in accordance with the following Equation 1 to obtain the output pixel data $D_{8n}$ to $D_{8n+7}$.

$$D_{8n} = a_7 S_{9m-1} + a_{15} S_{9m} + a_{23} S_{9n+1} + a_{31} A_{9m+2} \quad \text{Equation 1}$$
$$D_{8n+1} = a_6 S_{9m} + a_{14} S_{9m+1} + a_{22} S_{9m+2} + a_{30} S_{9m+3}$$
$$D_{8n+2} = a_5 S_{9m+1} + a_{13} S_{9m+2} + a_{21} S_{9m+3} + a_{29} S_{9m+4}$$
$$D_{8n+3} = a_4 S_{9m+2} + a_{12} S_{9m+3} + a_{20} S_{9m+4} + a_{28} S_{9m+5}$$
$$D_{8n+4} = a_3 S_{9m+3} + a_{11} S_{9m+4} + a_{19} S_{9m+5} + a_{27} S_{9m+6}$$
$$D_{8n+5} = a_2 S_{9m+4} + a_{10} S_{9m+5} + a_{18} S_{9m+6} + a_{26} S_{9m+7}$$
$$D_{8n+6} = a_1 S_{9m+5} + a_9 S_{9m+6} + a_{17} S_{9m+7} + a_{25} S_{9m+8}$$
$$D_{8n+7} = a_0 S_{9m+6} + a_8 S_{9m+7} + a_{16} S_{9m+8} + a_{24} S_{9m+9}$$

Values calculated in accordance with the following Equation 2 are used as coefficients $a_0$ through $a_{31}$ above.

| | | Equation 2 |
|---|---|---|
| $a_0 = -0.04613$ | $a_{16} = 0.84207$ | |
| $a_1 = -0.06877$ | $0_{17} = 0.81549$ | |
| $a_2 = -0.06008$ | $a_{18} = 0.73417$ | |
| $a_3 = -0.08928$ | $a_{19} = 0.64198$ | |
| $a_4 = -0.07083$ | $a_{20} = 0.51813$ | |
| $a_5 = -0.05932$ | $a_{21} = 0.38523$ | |
| $a_6 = -0.00696$ | $a_{22} = 0.26025$ | |
| $a_7 = 0.05414$ | $a_{23} = 0.14992$ | |
| $a_8 = 0.14992$ | $a_{24} = 0.05414$ | |
| $a_9 = 0.26025$ | $a_{25} = -0.00696$ | |
| $a_{10} = 0.38523$ | $a_{26} = -0.05932$ | |
| $a_{11} = 0.51813$ | $a_{27} = -0.07083$ | |
| $a_{12} = 0.64198$ | $a_{28} = -0.08928$ | |
| $a_{13} = 0.73417$ | $a_{29} = -0.06008$ | |
| $a_{14} = 0.81549$ | $a_{30} = -0.06877$ | |
| $a_{15} = 0.84207$ | $a_{31} = -0.04613$ | |

The above signal processing is individually performed on the Y signal data, $C_R$ signal data, and $C_B$ signal data. That is, the 8:9 pixel count conversion is performed on the Y, CR and CB signal data as shown in FIGS. 14A, 14B, and 14C to change the number of pixels in the horizontal direction from 720 to 640 as shown in FIGS. 15A, 15B, and 15C. If the image file data is to be displayed in the normal mode of the NTSC system, the component signal data as shown in FIGS. 15A–15C is outputted from the pixel count converter 22 for the appropriate display processing such that a still picture from the image file is subsequently displayed on the monitor 9.

If the image file data is displayed using the component signal data having the number of pixels as shown in FIGS. 14A–14C (without the pixel count conversion of the present invention), a picture with the incorrect aspect ratio is displayed. Namely, a deformed picture extended in the horizontal direction is displayed due to the difference in the aspect ratio: the aspect ratio of the region occupied by one pixel of the digital video format is 8:9 in the NTSC system, while the aspect ratio of a region occupied by one pixel on the computer display screen is 1:1 as described above.

In contrast to the above, the component signal data containing 640 by 480 pixels (as shown in FIGS. 15A–15C) subjected to the 8:9 pixel count conversion provides the correct picture display, because the aspect ratio difference is eliminated in accordance with the present invention.

7. Pixel Conversion in the PAL System (normal mode).

Next, the pixel count conversion is described for the image file data of the PAL system for display in the normal mode.

FIGS. 19A–19C show the signal component data for one frame (in the PAL system) which was decoded and outputted from the decoding unit 21. In the PAL system, one frame of the Y signal data has 720 (horizontal) by 576 (vertical) pixels, as shown in FIG. 19A, while one frame of the $C_R$ and $C_B$ signal data includes 360 by 288 pixels, as shown in FIGS. 19B and 19C.

Similar to the above processing operations with respect to the NTSC standard, the pixel count converter 22 converts the $C_R$ and $C_B$ signal data in order to equalize the number of pixels of chrominance signal data to those of the Y signal data. Thus, the number of pixels in the $C_R$ and $C_B$ signal data of FIGS. 19B and 19C is converted from 360 to 720 in the horizontal direction, while the number of pixels in the $C_R$ and $C_B$ signal data is converted from 288 to 576 in the vertical direction. As a result, the signal component data of FIGS. 19A–19C becomes the signal component data having the number of pixels as shown in FIGS. 20A–20C. The Y signal data remains unchanged (as shown in FIGS. 19A and 20A).

Figure 23A:
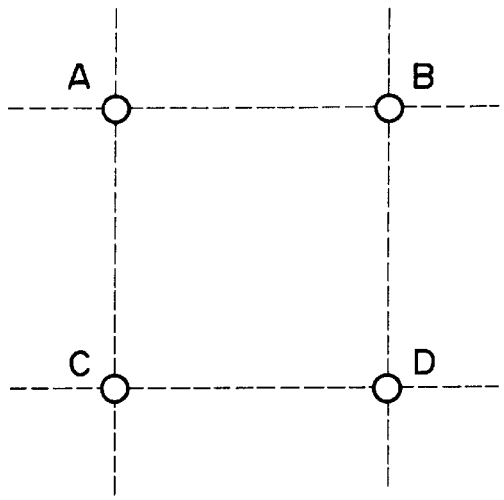
FIGS. 23A and 23B are diagrams of the filtering operation during the chrominance pixel count conversion in the PAL system.
Figure 23B:
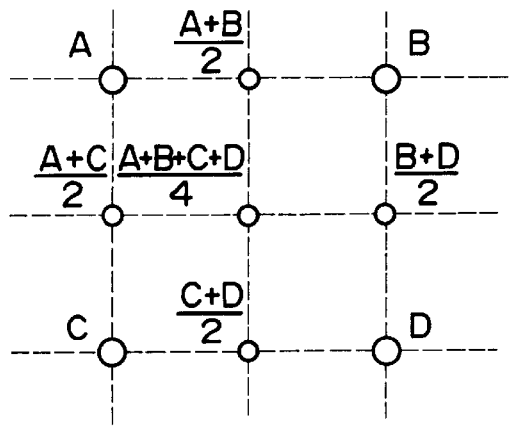

FIGS. 23A and 23B are diagrams of the filtering operation during the chrominance pixel count conversion in the PAL system. FIG. 23A shows four representative chrominance signal pixels A, B, C, and D arranged in a lattice formation in the horizontal/vertical direction on a screen. These four pixels represent the input data from the pixel count converter 22. Using a digital filter for converting the chrominance pixel count in the PAL system, the pixel count converter 22 interpolates pixel data as shown in FIG. 23B. Namely, pixels (A+B)/2, (A+C)/2, (C+D)/2, and (B+D)/2 are obtained as midpoints between the A and B pixels, A and C pixels, C and D pixels and B and D pixels, respectively. One additional pixel is interpolated by the following operation: (A+B+C+D)/4 which graphically represents the intersection of diagonals between the A and B pixels and between C and D pixels.

Such interpolation processing doubles the number of pixels of the chrominance signal data both in the horizontal and vertical directions on the screen. Hence, the number of pixels is converted from the $C_R$ and $C_B$ signal data of FIGS. 19B and 19C to those shown in FIGS. 20B and 20C, respectively.

After the component signal data undergoes the chrominance pixel count conversion as described above and shown in FIGS. 20A–20C, the number of pixels is again converted: the number of pixels of the signal component data of FIGS. 20A, 20B, and 20C is changed to those shown in FIGS. 21A, 21B, and 21C, respectively. That is, the number of pixels in the horizontal direction is individually converted for the Y, $C_R$ and $C_B$ signal data from 720 to 768. Since 768/720=16/15, this pixel count conversion is referred to as the 16:15 pixel count conversion. The 16:15 pixel count conversion is performed because the aspect ratio of the region occupied by one pixel is 16:15 in the normal display mode of the PAL system, as described hereinbefore.

FIGS. 24A and 24B are diagrams of the filtering operation during the 16:15 pixel count conversion by the pixel count converter 22 in the PAL system. FIG. 24A shows representative pixels $S_{15n-1}$ through $S_{15n+14}$ arranged in the horizontal direction, which constitute the component signal data as shown in FIGS. 20A–20C. The digital filter performs the operations in accordance with the following Equation 3 to obtain the output pixel data $D_{16n}$ to $D_{16n+15}$ as shown in FIG. 24B.

$$D_{16n} = a_0 S_{15n-2} + a_{16} S_{15n-1} + a_{32} S_{15n} a_{48} S_{15n+1}$$ Equation 3

$$D_{16n+1} = a_1 S_{15n-1} + a_{17} S_{15n} + a_{33} S_{15n+1} a_{49} S_{15n+2}$$

$$D_{16n+2} = a_2 S_{15n} + a_{18} S_{15n+1} + a_{34} S_{15n+2} a_{50} S_{15n+3}$$

$$D_{16n+3} = a_3 S_{15n+1} + a_{19} S_{15n+2} + a_{35} S_{15n+3} a_{51} S_{15n+4}$$

$$D_{16n+4} = a_4 S_{15n+2} + a_{20} S_{15n+3} + a_{36} S_{15n+4} a_{52} S_{15n+5}$$

$$D_{16n+5} = a_5 S_{15n+3} + a_{21} S_{15n+4} + a_{37} S_{15n+5} a_{53} S_{15n+6}$$

$$D_{16n+6} = a_6 S_{15n+4} + a_{22} S_{15n+5} + a_{38} S_{15n+6} a_{54} S_{15n+7}$$

$$D_{16n+7} = a_7 S_{15n+5} + a_{23} S_{15n+6} + a_{39} S_{15n+7} a_{55} S_{15n+8}$$

$$D_{16n+8} = a_8 S_{15n+6} + a_{24} S_{15n+7} + a_{40} S_{15n+8} a_{56} S_{15n+9}$$

$$D_{16n+9} = a_9 S_{15n+7} + a_{25} S_{15n+8} + a_{41} S_{15n+9} a_{57} S_{15n+10}$$

$$D_{16n+10} = a_{10} S_{15n+8} + a_{26} S_{15n+9} + a_{42} S_{15n+10} a_{58} S_{15n+11}$$

$$D_{16n+11} = a_{11} S_{15n+9} + a_{27} S_{15n+10} + a_{43} S_{15n+11} a_{59} S_{15n+12}$$

$$D_{16n+12} = a_{12} S_{15n+10} + a_{28} S_{15n+11} + a_{44} S_{15n+12} a_{60} S_{15n+13}$$

$$D_{16n+13} = a_{13} S_{15n+11} + a_{29} S_{15n+12} + a_{45} S_{15n+13} a_{61} S_{15n+14}$$

$$D_{16n+14} = a_{14} S_{15n+12} + a_{30} S_{15n+13} + a_{46} S_{15n+14} a_{62} S_{15n+15}$$

$$D_{16n+15} = a_{15} S_{15n+13} + a_{31} S_{15n+14} + a_{47} S_{15n+15} a_{63} S_{15n+16}$$

Values calculated in accordance with the following Equation 4 are used as coefficients $a_0$ through $a_{63}$ above.

| | | |
|---|---|---|
| $a^0 = 0.002806$ | $a_{33} = 0.46468$ | Equation 4 |
| $a_1 = -0.02780$ | $a_{34} = 0.44984$ | |
| $a_2 = -0.02528$ | $a_{35} = 0.43080$ | |
| $a_3 = -0.02702$ | $a_{36=} 0.40738$ | |
| $a_4 = -0.03087$ | $a_{37} = 0.38013$ | |
| $a_5 = -0.03557$ | $a_{38} = 0.35008$ | |
| $a_6 = -0.04033$ | $a_{39} = 0.29839$ | |
| $a_7 = -0.04180$ | $a_{40} = 0.26346$ | |
| $a_8 = -0.04410$ | $a_{41} = 0.24016$ | |
| $a_9 = -0.04708$ | $a_{42} = 0.20101$ | |

-continued $a_{10} = -0.04492$    $a_{43} = 0.16359$ $a_{11} = -0.04002$    $a_{44} = 0.12810$ $a_{12} = -0.03194$    $a_{45} = 0.09512$ $a_{13} = -0.02032$    $a_{46} = 0.06513$ $a_{14} = -0.00483$    $a_{47} = 0.03602$ $a_{15} = 0.01389$     $a_{48} = 0.01389$ $a_{16} = 0.03602$     $a_{49} = -0.00483$ $a_{17} = 0.06513$     $a_{50} = -0.02032$ $a_{18} = 0.09512$     $a_{51} = -0.03194$ $a_{19} = 0.12810$     $a_{52} = -0.04002$ $a_{20} = 0.24016$     $a_{53} = -0.04492$ $a_{21} = 0.20101$     $a_{54} = -0.04708$ $a_{22} = 0.24016$     $a_{55} = -0.04410$ $a_{23} = 0.26346$     $a_{56} = -0.04180$ $a_{24} = 0.29839$     $a_{57} = -0.04033$ $a_{25} = 0.35008$     $a_{58} = -0.03557$ $a_{26} = 0.38013$     $a_{59} = -0.03087$ $a_{27} = 0.40738$     $a_{60} = -0.02702$ $a_{28} = 0.43080$     $a_{61} = -0.02528$ $a_{29} = 0.44984$     $a_{62} = -0.02780$ $a_{30} = 0.46468$     $a_{63} = -0.02806$ $a_{31} = 0.44609$ $a_{32} = 0.44609$ The above signal processing is individually performed on the Y signal data, $C_R$ signal data, and $C_B$ signal data. That is, the 16:15 pixel count conversion is performed on the Y, $C_R$ and $C_B$ signal data as shown in FIGS. 20A, 20B, and 20C to change the number of pixels in the horizontal direction from 720 to 768 as shown in FIGS. 21A, 21B, and 21C. If the image file data is to be displayed in the normal mode of the PAL system, the component signal data as shown in FIGS. 21A–21C is outputted from the pixel count converter 22 for the appropriate display processing such that a still picture from the image file is subsequently displayed on the monitor 9.

If the image file data is displayed using the component signal data having the number of pixels as shown in FIGS. 20A–20C (without the pixel count conversion of the present invention), a picture with the incorrect aspect ratio is displayed. Namely, the vertically distorted picture is displayed due to the difference in the aspect ratio: the aspect ratio of the region occupied by one pixel of the digital video format is 16:15 in the PAL system, while the aspect ratio of a region occupied by one pixel on the computer display screen is 1:1 as described above.

In contrast to the above, the component signal data containing 768 by 576 pixels (as shown in FIGS. 21A–21C) subjected to the 16:15 pixel count conversion provides the correct picture display, because the aspect ratio difference is eliminated in accordance with the present invention.

8. Pixel Conversion in the Wide Mode.

Figures 16A, 16B, 16C:
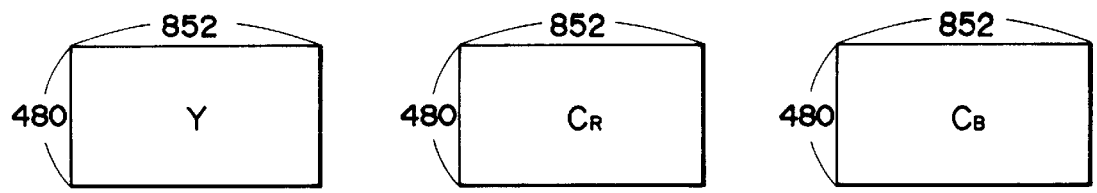
FIGS. 16A–16C show, in block diagram form, the number of pixels in one frame of the signal component data after the 4:3 pixel count conversion (wide mode) in the NTSC system.

If it is determined, based on the normal/wide identification signal, that the image file data is to be displayed in the wide mode, the pixel count converter 22 converts the component signal data of FIGS. 15A–15C to the component signal data having the number of pixels shown in FIGS. 16A–16C in the NTSC system. This conversion produces an image suitable for the wide mode display.

As shown in FIGS. 15A–15C, the number of pixels of the Y, $C_R$ and $C_B$ signal data in the horizontal direction is 640. Following the pixel count conversion, the Y, $C_R$ and $C_B$ signal data is converted to 852 in the horizontal direction, as shown in FIGS. 16A–16C. Then, the converted data is outputted from the pixel count converter 22 for the appropriate display processing such that a still picture based on the image file data is subsequently displayed on the monitor 9.

Similarly, in the PAL system as shown in FIGS. 21A–21C, the number of pixels of the Y, $C_R$ and $C_B$ signal data in the horizontal direction is 768. Following the pixel count conversion, the Y, $C_R$ and $C_B$ signal data is converted to 1024 in the horizontal direction, as shown in FIGS. 22A–22C. The converted data may then be outputted for subsequent display.

The pixel count conversion ratio of the wide mode is 852/640 (for the NTSC system) and 1024/768 (for the PAL system). Since 852/640=1024/768=4/3, the pixel count conversion processing corresponding to the wide mode is referred to as the 4:3 pixel count conversion. In other words, in both instances (the NTSC or PAL system), the 4:3 pixel count conversion may be performed for wide mode display.

FIGS. 25A and 25B are diagrams of the filtering operation during the 4:3 pixel count conversion by the pixel count converter 22 in the wide mode. The digital filter for the 4:3 pixel count conversion is applicable to the NTSC and PAL systems.

FIG. 25A shows representative pixels $S_{3n-2}$ through $S_{3n+4}$ arranged in the horizontal direction, which constitute the component signal data as shown in FIGS. 15A–15C or 21A–21C. The digital filter performs the operations in accordance with the following Equation 5 to obtain the output pixel data $D_{4n-1}$ to $D_{4n+4}$.

$$D_{4n} = a_0 S_{3n-2} + a_4 S_{3n-1} + a_8 S_{3n} + a_{12} S_{3n+1} \qquad \text{Equation 5}$$
$$D_{4n+1} = a_1 S_{3n-1} + a_5 S_{3n} + a_9 S_{3n+1} + a_{13} S_{3n+2}$$
$$D_{4n+2} = a_2 S_{3n} + a_6 S_{3n+1} + a_{10} S_{3n+2} + a_{14} S_{3n+3}$$
$$D_{4n+3} = a_3 S_{3n+1} + a_7 S_{3n+2} + a_{11} S_{3n+3} + a_{15} S_{3n+4}$$

Values calculated in accordance with the following Equation 6 are used as coefficients $a_0$ through $a_{15}$ above.

$a_0 = -0.00943$    Equation 6

$a_1 = -0.07718$ $a_2 = -0.10817$ $a_3 = -0.06594$ $a_4 = 0.11165$ $a_5 = 0.42344$ $a_6 = 0.76191$ $a_7 = 0.96372$ $a_8 = 0.96372$ $a_9 = 0.76191$ $a_{10} = 0.42344$

-continued $$a_{11} = 0.11165$$
$$a_{12} = -0.06594$$
$$a_{13} = -0.10817$$
$$a_{14} = -0.07718$$
$$a_{15} = -0.00943$$

The above pixel count conversion is performed on the Y, $C_R$ and $C_B$ signal data as shown in FIGS. 15A–15C or FIGS. 20A–20C to change the number of pixels in the horizontal direction from 640 to 852 in the NTSC system (as shown in FIGS. 16A–16C), or to change the number of pixels in the horizontal direction from 768 to 1024 in the PAL system (as shown in FIGS. 21A–21C). The image file data is therefore correctly displayed in the wide mode.

9. Pixel Conversion Sequencing Flowchart.

Figure 26:
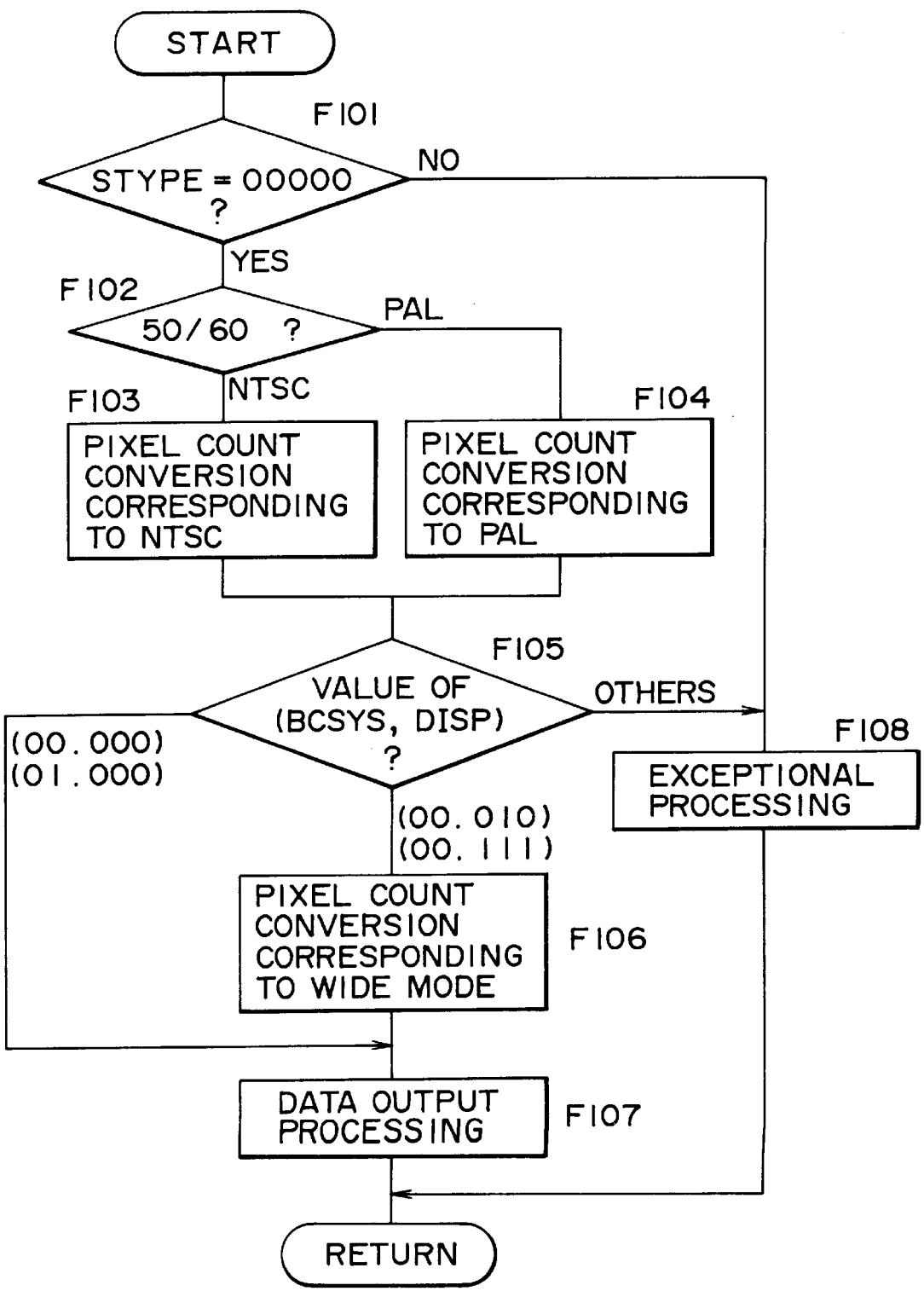
FIG. 26 is a sequencing flowchart of the pixel count conversion.

FIG. 26 is a sequencing flowchart of the pixel count conversion carried out by executing the instructions of the image capture/display program 4a, such that an image based on the image file data is correctly displayed on the monitor 9. The flowchart depicts the processing operations performed by the pixel count converter 22 of FIG. 4. It is noted that the mode determination unit 36 of FIG. 5 determines whether the NTSC or PAL system is used and whether the image is to displayed in the normal or wide mode.

As shown in FIG. 26, it is first determined in step F101 whether "Stype" is 00000 (in binary) by accessing the VAUX Source information in the VAUX block. If "Stype" is not 00000, the exception processing in step F108 is carried out. A representative exception processing may include, for example, display of an error message on the monitor 9 indicating that this image file cannot be processed or this file is not an image file.

If, on the other hand, "Stype" is determined (by the mode determination unit 36) to be 00000 in step F101, then the operation proceeds to step F102. In this step, it is determined whether the image file data corresponds to the NTSC system or the PAL system based on data in the "50/60" area in VAUX Source. If the image file data was created in accordance with the NTSC system (as determined in step F102), the pixel count conversion processing corresponding to the NTSC system is performed in step F103. Namely, the data supplied from the decoding unit 21 is subjected to the chrominance pixel count conversion and 8:9 pixel count conversion as illustrated in FIGS. 13A–13C, 14A–14C and 15A–15C.

If the image file data is determined in step F102 to be based on the PAL system, the pixel count conversion processing corresponding to the PAL system is performed in step F104. In particular, the chrominance pixel count conversion and 16:15 pixel count conversion are carried out as illustrated in FIGS. 19A–19C, 20A–20C and 21A–21C.

After the above operation (either in step F103 or F104), the value of (BCSYS, DISP) is determined in step F105 by referring to the "BCSYS" and "DISP" data areas in VAUX Source Control. If (CSYS, DISP) have binary values of (00, 000) or (01, 000), respectively, then the image file data is output in the normal mode in step F107. That is, the pixel-converted data is supplied to the RGB converter 23 of FIG. 4. As a result, the still picture based on the image file data is displayed in the normal mode on the monitor 9.

If (CSYS, DISP) are detected as (00, 010) or (01, 111) in step F105, the image file data is to be displayed in the wide mode. In step 106, the image file data which was converted in step F103 or F104 undergoes the 4:3 pixel count conversion corresponding to the wide mode, as described with reference to FIGS. 25A and 25B, and then the process proceeds to the processing operation of step F107. Hence, the image file data (as shown in FIGS. 16A–16C or 22A–22C) is reproduced on the monitor 9 as the still picture with the correct aspect ratio in the wide mode. If (BCSYS, DISP) do not correspond to any of the above binary combinations (i.e., (00, 000), (01, 000), (00, 010), or (01, 111)), the exception processing operation is performed in step F108 because this image file cannot be processed by the image capturing/display program 4a.

In accordance with this embodiment, during the pixel count conversion (8:9, 16:15 and/or 4:3) for displaying a picture with the correct aspect ratio on the computer monitor, the conversion processing operations do not affect the number of pixels in the vertical direction while the number of pixels in the horizontal direction is varied. It is understood, of course, the reverse situation may be handled by the present invention in a similar manner: the conversion may include not varying the number of pixels in the horizontal direction while changing the number of pixels in the vertical direction.

Further in this embodiment, the computer 2 includes the image capture/display program 4a whose instructions are executed to capture a digital picture signal, to generate an image file, and to display the image corresponding to the image file. In addition, in accordance with this embodiment, the program 4a performs the pixel count conversion for displaying a picture with the correct aspect ratio. Alternatively, the present invention can be applied, for example, to a computer system in which "browser" software is used for decoding and displaying an image based on a digital video format, without the image capturing function.

According to the present invention, image file data is generated based on image data extracted per frame unit basis from a digital picture signal of moving images. An image based on the image file data is displayed on a screen of the computer system with the correct aspect ratio regardless of the difference between the aspect ratio of the area occupied by one pixel (sample) and the aspect ratio of the pixel as displayed on the computer screen. Since the pixel count conversion ratio is selectively changed so that the image file data conforms to the preselected television system and display mode, a picture with the correct aspect ratio may be displayed in accordance with many television systems and display modes.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A method for displaying on a computer display with a correct aspect ratio an image represented by coded digital image data formatted for a display having a different aspect ratio, wherein said image displayed on said computer display is deformed due to the different aspect ratio when imaged on said computer display, comprising the steps of:

extracting image data from said coded digital image data, the extracted image data being represented by frame data of said coded digital image data;

decoding the extracted image data represented by a predetermined number of pixels;

converting the decoded image data by selectively changing said predetermined number of pixels in a horizontal or vertical direction of said image such that said image represented by the converted image data is displayed with said correct aspect ratio such that said image is not deformed when displayed on said computer display; and wherein said step of converting increases said predetermined number of pixels to a number which exceeds a correct number of pixels corresponding to said correct aspect ratio and then decreases the number of pixels to said correct number of pixels.

2. The method according to claim 1, further comprising the step of determining a television system format having said different aspect ratio corresponding to said display, wherein said predetermined number of pixels is changed on the basis of said television system format.

3. The method according to claim 1, further comprising the step of determining a display mode corresponding to said image data, wherein said predetermined number of pixels is changed on the basis of said display mode.

4. The method according to claim 3, wherein said display mode includes a normal mode and a wide mode.

5. Apparatus for displaying on a computer display with a correct aspect ratio an image represented by coded digital image data formatted for a display having a different aspect ratio wherein said image displayed on said computer display is deformed due to the different aspect ratio when imaged on said computer display, comprising:

means for extracting image data from said coded digital moving image data, said extracted image data being represented by frame data of said coded digital image data;

means for decoding the extracted image data represented by a predetermined number of pixels;

means for converting the decoded image data by selectively changing said predetermined number of pixels in a horizontal or vertical direction of said image such that said image represented by the converted image data is displayed with said correct aspect ratio such that said image is not deformed when displayed on said computer display; and wherein said means for converting increases said predetermined number of pixels to a number which exceeds a correct number of pixels corresponding to said correct aspect ratio and then decreases the number of pixels to said correct number of pixels.

6. Apparatus according to claim 5, further comprising means for determining a television system format corresponding to said display having said different aspect ratio, wherein said predetermined number of pixels is changed on the basis of said television system format.

7. Apparatus according to claim 5, further comprising means for determining a display mode corresponding to said image data, wherein said predetermined number of pixels is changed on the basis of said display mode.

8. Apparatus according to claim 7, wherein said display mode includes a normal mode and a wide mode.

9. Apparatus according to claim 5, further comprising an external source for providing said coded digital image data.

10. The method according to claim 1, wherein said step of extracting extracts the image data from a series of images comprising a motion picture.

11. The method according to claim 1, wherein said step of converting converts said predetermined number of pixels corresponding to a color component of the image from 180 to 720 pixels.

12. The method according to claim 11, wherein said step of converting preserves the predetermined number of pixels for a luminance component of the image.

13. The method according to claim 11, wherein said step of converting increases the predetermined number of pixels of said color component by interpolation.

14. The method according to claim 1, wherein said step of converting decreases the predetermined number of pixels by digital filtering.

15. The method according to claim 1, wherein said step of converting converts said predetermined number of pixels for a color component of the image from 360 to 720 pixels in a first direction.

16. The method according to claim 15, wherein said step of converting converts said predetermined number of pixels of said color component of the image from 288 to 576 pixels in a second direction.

17. The method according to claim 16, wherein said step of converting preserves said predetermined number of pixels for a luminance component of the image.

18. The method according to claim 1, wherein said step of converting interpolates an additional pixel graphically representing an intersection of diagonals extending from a lattice of pixels.

19. The method according to claim 1, wherein said step of converting converts said predetermined number of pixels for each of luminance and color components of the image to 852 pixels.

20. The method according to claim 1, wherein said step of converting changes said predetermined number of pixels for each of luminance and color components of the image to 768 pixels.

21. The method according to claim 19, wherein said step of converting converts said predetermined number of pixels for said luminance and color components of the image from 852 to 1,024 pixels.

* * * * *

UNITED STATES PATENT AND TRADEMARK OFFICE
CERTIFICATE OF CORRECTION

PATENT NO. : 6,157,410  
DATED : December 5, 2000  
INVENTOR(S) : Izumi et al.

Page 1 of 1

It is certified that error appears in the above-identified patent and that said Letters Patent is hereby corrected as shown below:

[30] Foreign Application Priority Data:
May 17, 1996     [JP]     Japan ...................... 8-146496

Signed and Sealed this

Twenty-fifth Day of September, 2001

Attest:

*Attesting Officer*

NICHOLAS P. GODICI  
*Acting Director of the United States Patent and Trademark Office*